(12) United States Patent
Kim

(10) Patent No.: US 12,414,190 B2
(45) Date of Patent: Sep. 9, 2025

(54) METHOD AND APPARATUS FOR RRC_CONNECTED STATE UPLINK TRANSMISSION AND RRC_INACTIVE UPLINK TRANSMISSION IN WIRELESS MOBILE COMMUNICATION SYSTEM

(71) Applicants: BLACKPIN INC., Seoul (KR); Soenghun Kim, Hanam-si (KR)

(72) Inventor: Soenghun Kim, Hanam-si (KR)

(73) Assignees: Blackpin Inc., Seoul (KR); Soenghun Kim, Gyeonggi-do (KR)

( * ) Notice: Subject to any disclaimer, the term of this patent is extended or adjusted under 35 U.S.C. 154(b) by 433 days.

(21) Appl. No.: 18/110,908

(22) Filed: Feb. 17, 2023

(65) Prior Publication Data
US 2023/0300939 A1    Sep. 21, 2023

(30) Foreign Application Priority Data
Mar. 18, 2022    (KR) .................. 10-2022-0033901

(51) Int. Cl.
H04W 4/00     (2018.01)
H04W 52/14    (2009.01)
H04W 76/27    (2018.01)

(52) U.S. Cl.
CPC ......... H04W 76/27 (2018.02); H04W 52/146 (2013.01)

(58) Field of Classification Search
None
See application file for complete search history.

(56) References Cited

U.S. PATENT DOCUMENTS

| | | | |
|---|---|---|---|
| 2021/0307055 A1* | 9/2021 | Tsai | H04W 72/23 |
| 2022/0022247 A1* | 1/2022 | Agiwal | H04W 72/0453 |
| 2022/0022276 A1* | 1/2022 | Shih | H04W 72/0453 |
| 2022/0086899 A1* | 3/2022 | Shih | H04L 5/0053 |
| 2022/0174723 A1* | 6/2022 | Wei | H04W 74/0833 |

OTHER PUBLICATIONS

Introduction of SDT, ZTE Coroporation, 3GPP TSG-RAN WG2 Meeting #116-bise, R2-2203768, Mar. 3, 2022.

* cited by examiner

*Primary Examiner* — Zewdu A Beyen
(74) *Attorney, Agent, or Firm* — Fish & Richardson P.C.

(57) ABSTRACT

A method and apparatus for uplink transmission in RRC_CONNECTED state and in RRC_INACTIVE state is provided. A method and apparatus for uplink transmission in RRC_CONNECTED state and in RRC_INACTIVE state includes receiving configuration information in RRCRelease, performing a PUSCH transmission in RRC_INACTIVE based on a power offset and a RNTI indicated in the RRCRelease.

4 Claims, 9 Drawing Sheets

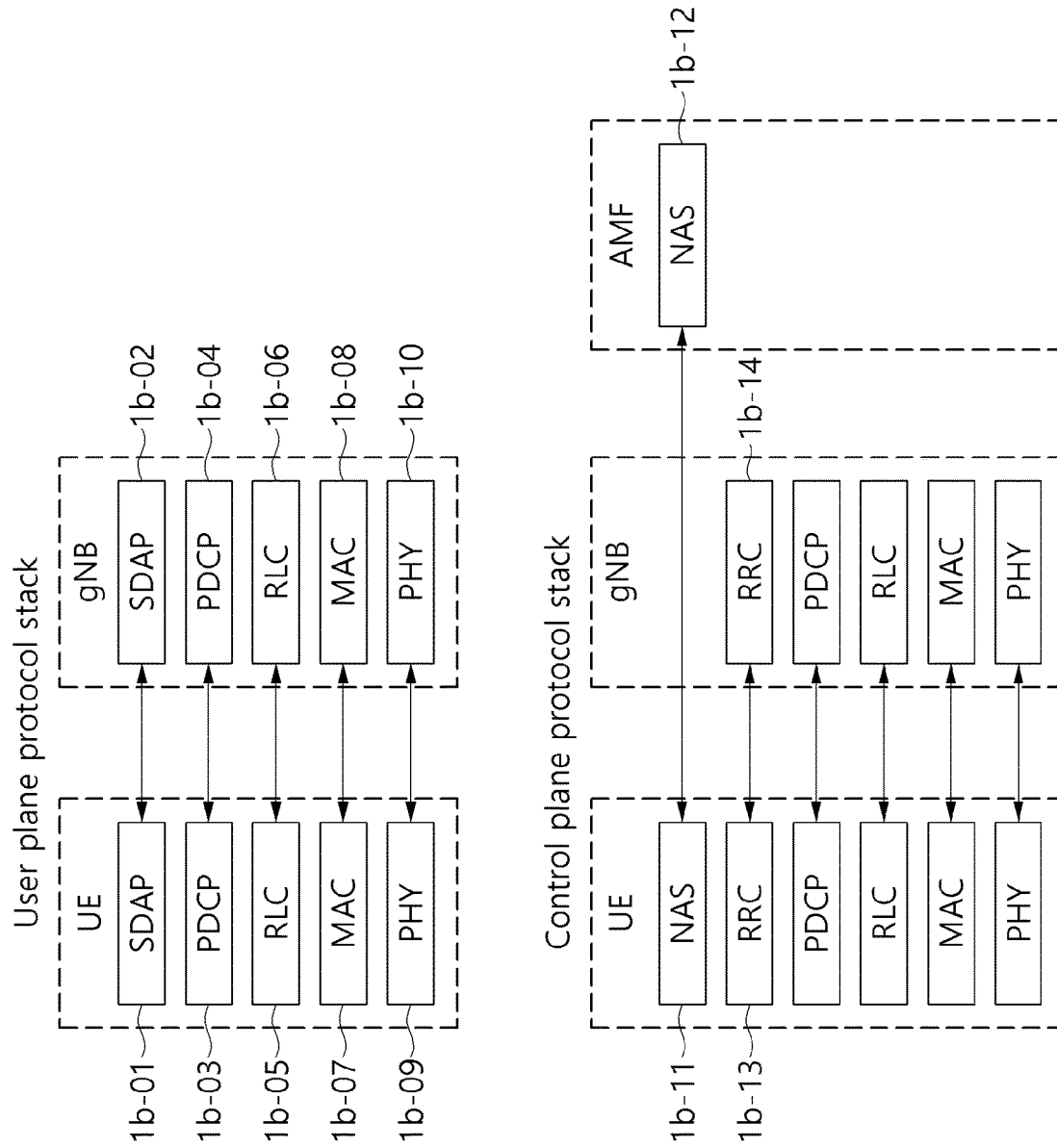

METHOD AND APPARATUS FOR RRC_CONNECTED STATE UPLINK TRANSMISSION AND RRC_INACTIVE UPLINK TRANSMISSION IN WIRELESS MOBILE COMMUNICATION SYSTEM

CROSS-REFERENCE TO RELATED APPLICATION

This application claims priority to and the benefit of Korean Patent Application No. 10-2022-0033901, filed on Mar. 18, 2022, the disclosure of which is incorporated herein by reference in its entirety.

BACKGROUND

Technical Field

The present disclosure relates to a mobile communication system with uplink transmission in RRC_INACTIVE state. More specifically, the present disclosure relates to PUSCH transmission in RRC_INACTIVE state based on a power offset and a RNTI indicated in the RRCRelease.

Related Art

To meet the increasing demand for wireless data traffic since the commercialization of 4th generation (4G) communication systems, the 5th generation (5G) system is being developed. For the sake of high, 5G system introduced millimeter wave (mmW) frequency bands (e. g. 60 GHz bands). In order to increase the propagation distance by mitigating propagation loss in the 5G communication system, various techniques are introduced such as beamforming, massive multiple-input multiple output (MIMO), full dimensional MIMO (FD-MIMO), array antenna, analog beamforming, and large-scale antenna. In addition, base station is divided into a central unit and plurality of distribute units for better scalability. To facilitate introduction of various services, 5G communication system targets supporting higher data rate and smaller latency.

SUMMARY

Aspects of the present disclosure are to address the problems of uplink transmission in RRC_INACTIVE state. Accordingly, an aspect of the present disclosure is to provide a method and an apparatus for uplink transmission in RRC_INACTIVE state. In accordance with an aspect of the present disclosure, a method of a terminal in mobile communication system is provided. In the method, UE receives from a base station a RRCRelease message including a power offset and a RNTI and performs uplink transmission based on the power offset and the RNTI in RRC_INACTIVE.

BRIEF DESCRIPTION OF THE DRAWINGS

FIG. 1B is a diagram illustrating a wireless protocol architecture in an 5G system to which the disclosure may be applied.

DETAILED DESCRIPTION

Figure 1A:
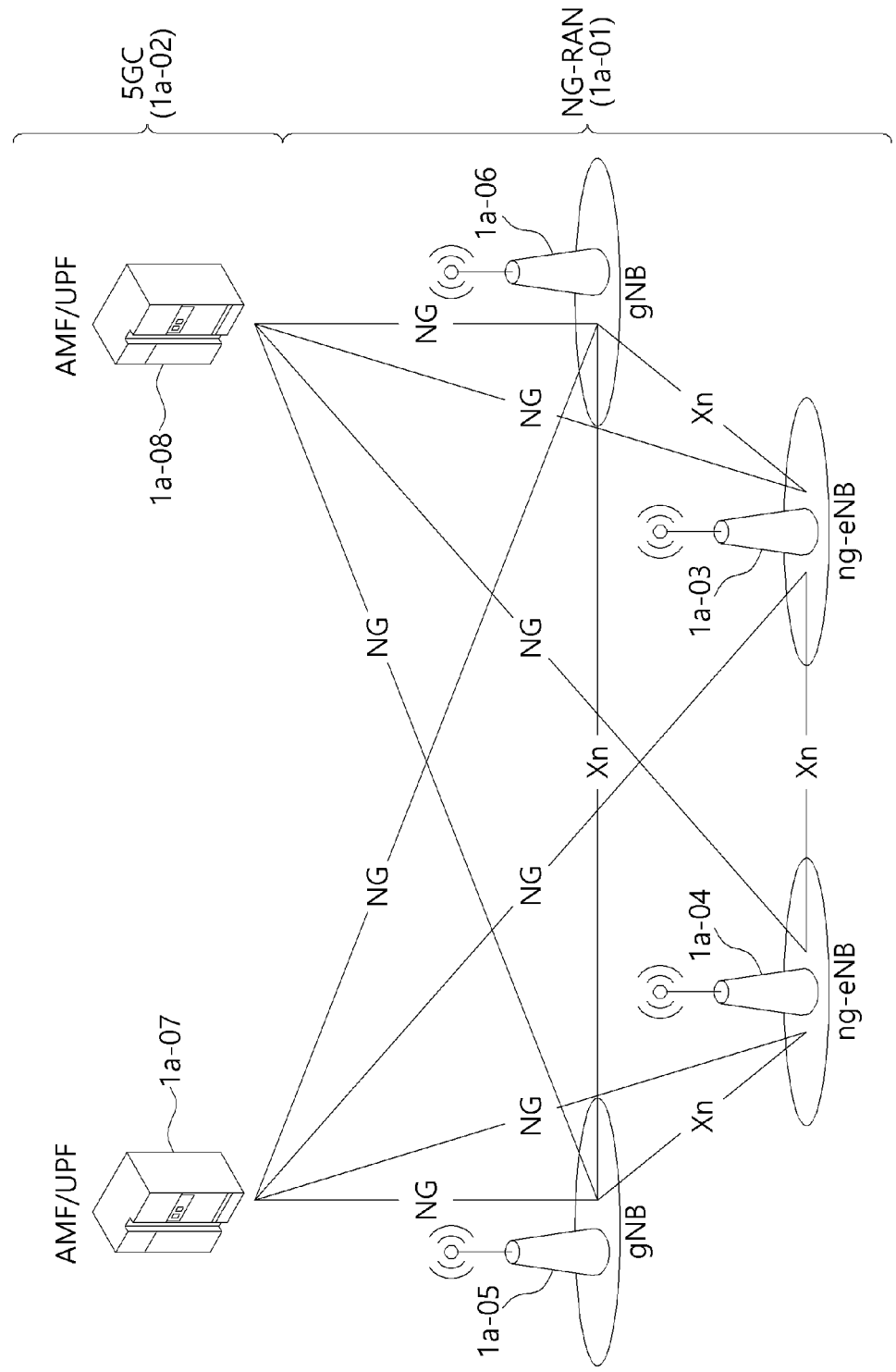
FIG. 1A is a diagram illustrating the architecture of an 5G system and a NG-RAN to which the disclosure may be applied.

Hereinafter, embodiments of the present invention will be described in detail with reference to the accompanying drawings. In addition, in the description of the present invention, if it is determined that a detailed description of a related known function or configuration may unnecessarily obscure the gist of the present invention, the detailed description thereof will be omitted. In addition, the terms to be described later are terms defined in consideration of functions in the present invention, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

Table 1 lists the acronyms used throughout the present disclosure.

TABLE 1

| Acronym | Full name |
| --- | --- |
| 5GC | 5G Core Network |
| ACK | Acknowledgement |
| AM | Acknowledged Mode |
| AMF | Access and Mobility Management Function |
| ARQ | Automatic Repeat Request |
| AS | Access Stratum |
| ASN.1 | Abstract Syntax Notation One |
| BSR | Buffer Status Report |
| BWP | Bandwidth Part |
| CA | Carrier Aggregation |
| CAG | Closed Access Group |
| CG | Cell Group |
| C-RNTI | Cell RNTI |
| CSI | Channel State Information |
| DCI | Downlink Control Information |
| DRB | (user) Data Radio Bearer |
| DRX | Discontinuous Reception |
| HARQ | Hybrid Automatic Repeat Request |
| IE | Information element |
| LCG | Logical Channel Group |

TABLE 1-continued

| Acronym | Full name |
|---|---|
| MAC | Medium Access Control |
| MIB | Master Information Block |
| NAS | Non-Access Stratum |
| NG-RAN | NG Radio Access Network |
| NR | NR Radio Access |
| PBR | Prioritised Bit Rate |
| PCell | Primary Cell |
| PCI | Physical Cell Identifier |
| PDCCH | Physical Downlink Control Channel |
| PDCP | Packet Data Convergence Protocol |
| PDSCH | Physical Downlink Shared Channel |
| PDU | Protocol Data Unit |
| PHR | Power Headroom Report |
| PLMN | Public Land Mobile Network |
| PRACH | Physical Random Access Channel |
| PRB | Physical Resource Block |
| PSS | Primary Synchronisation Signal |
| PUCCH | Physical Uplink Control Channel |
| PUSCH | Physical Uplink Shared Channel |
| RACH | Random Access Channel |
| RAN | Radio Access Network |
| RA-RNTI | Random Access RNTI |
| RAT | Radio Access Technology |
| RB | Radio Bearer |
| RLC | Radio Link Control |
| RNA | RAN-based Notification Area |
| RNAU | RAN-based Notification Area Update |
| RNTI | Radio Network Temporary Identifier |
| RRC | Radio Resource Control |
| RRM | Radio Resource Management |
| RSRP | Reference Signal Received Power |
| RSRQ | Reference Signal Received Quality |
| RSSI | Received Signal Strength Indicator |
| SCell | Secondary Cell |
| SCS | Subcarrier Spacing |
| SDAP | Service Data Adaptation Protocol |
| SDU | Service Data Unit |
| SFN | System Frame Number |
| S-GW | Serving Gateway |
| SI | System Information |
| SIB | System Information Block |
| SpCell | Special Cell |
| SRB | Signalling Radio Bearer |
| SRS | Sounding Reference Signal |
| SSB | SS/PBCH block |
| SSS | Secondary Synchronisation Signal |
| SUL | Supplementary Uplink |
| TM | Transparent Mode |
| UCI | Uplink Control Information |
| UE | User Equipment |
| UM | Unacknowledged Mode |

Table 2 lists the terminologies and their definition used throughout the present disclosure.

TABLE 2

| Terminology | Definition |
|---|---|
| allowedCG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |
| allowedSCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |
| allowedServingCells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |
| discardTimer | Timer to control the discard of a PDCP SDU. Starting when the SDU arrives. Upon expiry, the SDU is discarded. |
| F | The Format field in MAC subheader indicates the size of the Length field. |
| Field | The individual contents of an information element are referred to as fields. |
| Frequency layer | set of cells with the same carrier frequency. |
| Global cell identity | An identity to uniquely identifying an NR cell. It is consisted of |

TABLE 2-continued

| Terminology | Definition |
| --- | --- |
| | cellIdentity and plmn-Identity of the first PLMN-Identity in plmn-IdentityList in SIB1. |
| gNB | node providing NR user plane and control plane protocol terminations towards the UE, and connected via the NG interface to the 5GC. |
| Handover | procedure that changes the serving cell of a UE in RRC_CONNECTED. |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code - Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| LogicalChannelConfig | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List etc |
| logicalChannelGroup | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |
| Master Cell Group | in MR-DC, a group of serving cells associated with the Master Node, comprising of the SpCell (PCell) and optionally one or more SCells. |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCP entity reestablishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCH SCell | a Secondary Cell configured with PUCCH. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/ DC the term 'serving cells' is |

TABLE 2-continued

| Terminology | Definition |
|---|---|
| | used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers" (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e. RSRP and RSRQ are better than specific values |
| t-Reordering | Timer to control the reordering operation of received PDCP packets. Upon expiry, PDCP packets are processed and delivered to the upper layers. |
| TX_NEXT | This state variable indicates the COUNT value of the next PDCP SDU to be transmitted. |
| UE Inactive AS Context | UE Inactive AS Context is stored when the connection is suspended and restored when the connection is resumed. It includes information below.<br>the current KgNB and KRRCint keys, the ROHC state, the stored QoS flow to DRB mapping rules, the C-RNTI used in the source PCell, the cellIdentity and the physical cell identity of the source PCell, the spCellConfigCommon within ReconfigurationWithSync of the NR PSCell (if configured) and all other parameters configured except for:<br>parameters within ReconfigurationWithSync of the PCell;<br>parameters within ReconfigurationWithSync of the NR PSCell, if configured;<br>parameters within MobilityControlInfoSCG of the E-UTRA PSCell, if configured;<br>servingCellConfigCommonSIB; |

In the present invention, "trigger" or "triggered" and "initiate" or "initiated" may be used in the same meaning.

In the present invention, "radio bearers allowed for the second resume procedure", "radio bearers for which the second resume procedure is configured", and "radio bearers for which the second resume procedure is enabled" may all have the same meaning.

In the present invention, second resume procedure and SDT (Small Data Transmission) may be used in the same meaning.

In the present invention, UE and terminal may be used in the same meaning. In the present invention, NG-RAN node and base station may be used in the same meaning.

FIG. 1A is a diagram illustrating the architecture of an 5G system and a NG-RAN to which the disclosure may be applied.

5G system consists of NG-RAN 1a-01 and 5GC 1a-02. An NG-RAN node is either:
 a gNB, providing NR user plane and control plane protocol terminations towards the UE; or
 an ng-eNB, providing E-UTRA user plane and control plane protocol terminations towards the UE.

The gNBs 1a-05 or 1a-06, and ng-eNBs 1a-03 or 1a-04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1a-07 and UPF 1a-08 may be realized as a physical node or as separate physical nodes.

A gNB 1a-05 or 1a-06, or an ng-eNBs 1a-03 or 1a-04 hosts the functions listed below.
 Functions for Radio Resource Management such as Radio Bearer Control, Radio Admission Control, Connection Mobility Control, Dynamic allocation of resources to UEs in uplink, downlink and sidelink(scheduling); and
 IP and Ethernet header compression, uplink data decompression and encryption of user data stream; and
 Selection of an AMF at UE attachment when no routing to an MME can be determined from the information provided by the UE; and
 Routing of User Plane data towards UPF; and
 Scheduling and transmission of paging messages; and
 Scheduling and transmission of broadcast information (originated from the AMF or O&M); and Measurement and measurement reporting configuration for mobility and scheduling; and Session Management; and QoS Flow management and mapping to data radio bearers; and Support of UEs in RRC_INACTIVE state; and Radio access network sharing; and Tight interworking between NR and E-UTRA; and Support of Network Slicing.

The AMF 1a-07 hosts the functions such as NAS signaling, NAS signaling security, AS security control, SMF selection, Authentication, Mobility management and positioning management.

The UPF 1a-08 hosts the functions such as packet routing and forwarding, transport level packet marking in the uplink, QoS handling and the downlink, mobility anchoring for mobility etc.

FIG. 1B is a diagram illustrating a wireless protocol architecture in an 5G system to which the disclosure may be applied.

User plane protocol stack consists of SDAP 1b-01 or 1b-02, PDCP 1b-03 or 1b-04, RLC 1b-05 or 1b-06, MAC 1b-07 or 1b-08, and PHY 1b-09 or 1b-10. Control plane protocol stack consists of NAS 1b-11 or 1b-12, RRC 1b-13 or 1b-14, PDCP, RLC, MAC and PHY.

Each protocol sublayer performs functions related to the operations listed in the table 3.

TABLE 3

| Sublayer | Functions |
|---|---|
| NAS | authentication, mobility management, security control etc |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
|---|---|
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection;Broadcast of system information;Cell re-selection mobility; |

TABLE 4-continued

| RRC state | Characteristic |
|---|---|
| RRC_CONNECTED | Paging is initiated by NG-RAN (RAN paging); RAN-based notification area (RNA) is managed by NG- RAN; DRX for RAN paging configured by NG-RAN; 5GC - NG-RAN connection (both C/U-planes) is established for UE; The UE AS context is stored in NG-RAN and the UE; NG-RAN knows the RNA which the UE belongs to. 5GC - NG-RAN connection (both C/U-planes) is established for UE; The UE AS context is stored in NG-RAN and the UE; NG-RAN knows the cell which the UE belongs to; Transfer of unicast data to/from the UE; Network controlled mobility including measurements. |

Figure 1C:
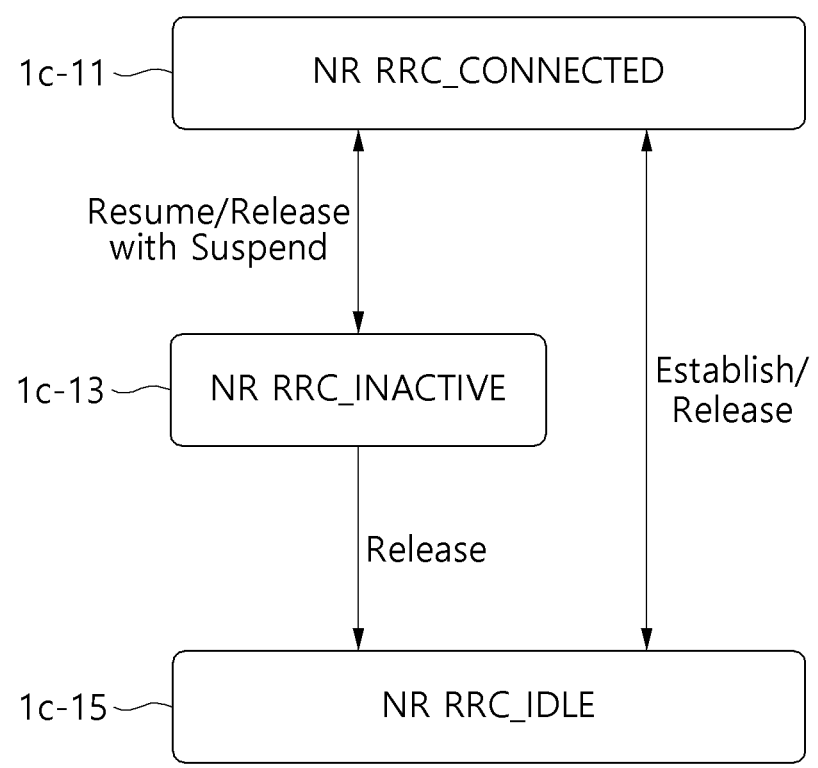
FIG. 1C is a diagram illustrating an RRC state transition.

FIG. 1C is a diagram illustrating an RRC state transition.

Between RRC_CONNECTED 1c-11 and RRC_INACTIVE 1c-13, a state transition occurs due to the exchange of the Resume message and the Release message containing the Suspend IE.

The state transition from RRC_INACTIVE to RRC_CONNECTED involves not only signal exchange between the terminal and the base station, but also context transfer and data path change between the base stations. If the terminal has enough data to transmit, these additional procedures can be sufficiently justified, but if not, excessive overhead can reduce the efficiency of the network.

The present invention introduces a new resumption procedure capable of transmitting and receiving data without transition to RRC_CONNECTED. Hereinafter, a resume procedure for the purpose of transitioning the terminal to the RRC_CONNECTED state from the RRC_INACTIVE state is referred to as a first resume procedure, and a procedure for transmitting and receiving data while the terminal is in the RRC_INACTIVE state is referred to as a second resume procedure. Through the first resume procedure, the terminal may resume the suspended RRC connection, and through the second resumption procedure, the terminal may resume data transmission and reception. The terminal may switch to the first resume procedure while performing the second resume procedure.

A state transition occurs between RRC_CONNECTED 1c-11 and RRC_IDLE 1c-15 through RRC connection establishment and RRC connection release.

Figure 1D:
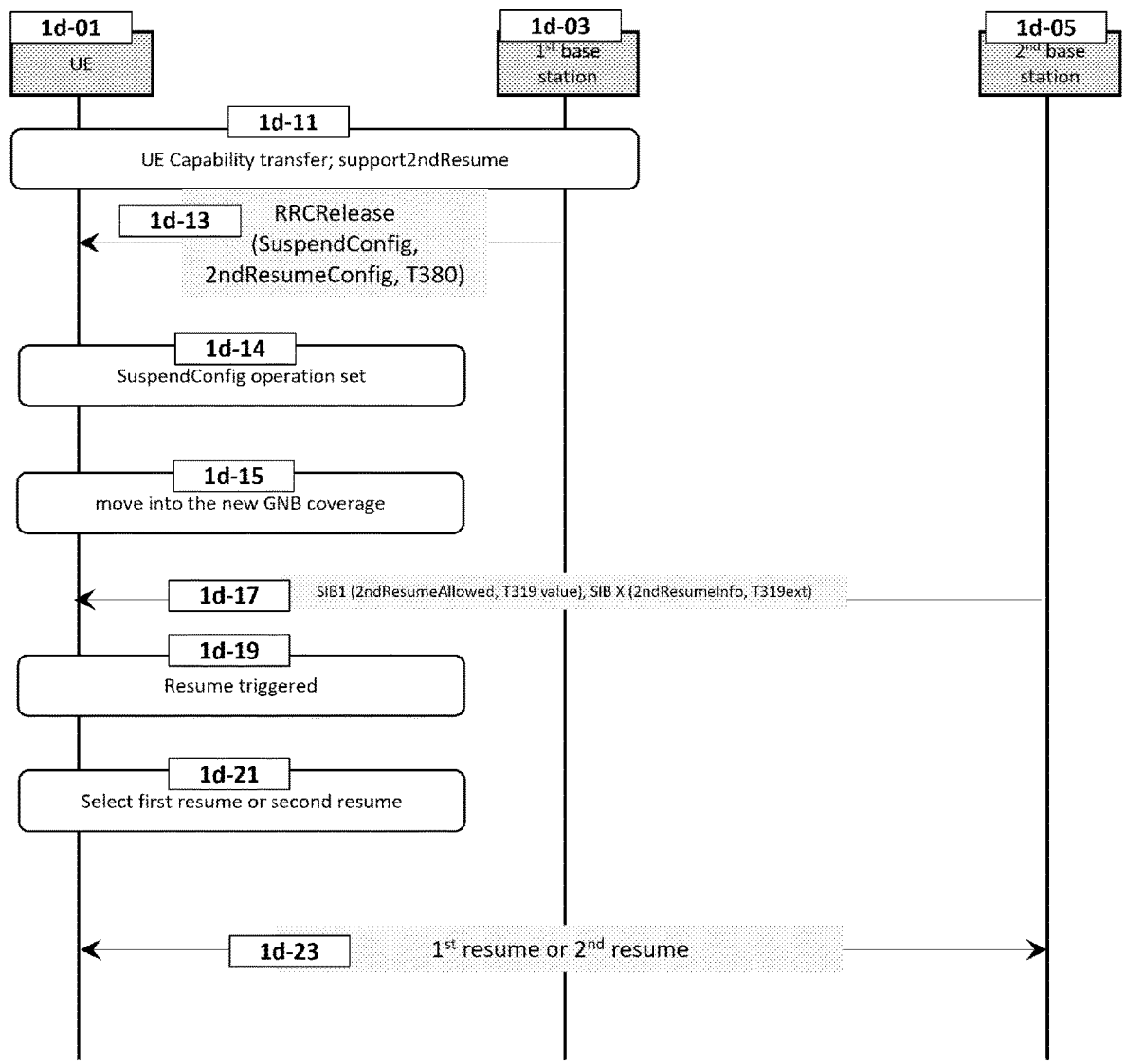
FIG. 1D is a diagram illustrating operations of a terminal and a base station according to an embodiment of the present invention.

FIG. 1D is a diagram illustrating operations of a terminal and a base station.

In a wireless communication system including a terminal 1d-01, a first base station 1d-03, and a second base station 1d-05, the terminal and the base station operate as follows.

In steps 1d-11, the terminal reports capability to the first base station or another base station. The UE capability information transfer procedure consists of transmitting an RRC control message called UECapabilityInformation containing UE capability information to the serving base station if the serving base station transmits an RRC message requesting UE capability information. UECapabilityInformation includes the following information.

<UECapabilityInformation>

1. First information related to RRC_INACTIVE: 1-bit information indicating whether the terminal supports RRC_INACTIVE. Only one 1-bit is reported regardless of the number of bands supported by the terminal.

2. Second information related to RRC_INACTIVE: information indicating whether the second resume procedure is supported or not. It may indicate whether the second resume procedure is supported for each band supported by the terminal. When the terminal supports n bands, n 1-bit information is reported.

3. Various pieces of capability information related to data transmission/reception between the terminal and the base station (for example, whether specific decoding is supported, etc.).

The terminal supporting RRC_INACTIVE supports the first resumption procedure in all frequency bands supported by the terminal. That is, the first information related to RRC_INACTIVE support is information applied to a plurality of bands, and the second information related to RRC_INACTIVE is information applied to one band. A terminal that does not support RRC_INACTIVE does not support the second resumption procedure in any frequency band that it supports. The serving base station provides appropriate NR configuration information to the UE by referring to the capability of the UE. The UE and the serving base station transmit and receive data in the RRC_CONNECTED state, and when the data transmission and reception are completed, the serving base station determines to transition the terminal state to the RRC_INACTIVE state.

In step 1d-13, the first base station transmits an RRCRelease message to the terminal. The RRCRelease message includes SuspendConfig IE, and SuspendConfig includes the following information.

<SuspendConfig>
1. The first terminal identifier: an identifier of a terminal that may be included in the ResumeRequest when a state transition to RRC_CONNECTED is made. It has a 40-bit length.
2. The second terminal identifier: an identifier of a terminal that may be included in the Resume Request when a state transition to RRC_CONNECTED is made. It has a 24-bit length.
3. ran-Paging Cycle: Paging cycle to be applied in RRC_INACTIVE state.
4. ran-Notification AreaInfo: Configuration information of a ran-Notification Area consisting of a list of cells and the like. The terminal initiates a resume procedure when the ran Notification Area is changed.
5. t380: Timer related to the periodic resumption procedure.
6. NextHopChangingCount (NCC): Counter used to derive new security keys after performing the resume procedure.
7. Second resume procedure related information: List of DRBs configured with second resume procedures, 1-bit information indicating whether the second resume procedure is configured for SRB2, 1-bit information indicating whether the second resume procedure is configured for SRB4, Data volume threshold of the second resume procedure (hereinafter referred to as dedicated data threshold), reference signal received power threshold of the second resume procedure (hereinafter referred to as dedicated reference signal received power threshold)

Since SRB1 among SRB1, SRB2, SRB3, and SRB4 transmits and receives the most important RRC control message, it is important to quickly transmit the RRC control message as the second resumption procedure, and the second resumption procedure is highly effective for SRB1. SRB2 and SRB4 are less important than SRB1 because relatively large messages can occur, but they still transmit important control messages, so the second resumption procedure is effective for SRB2 and SRB4. SRB3 is not used when multiple connections are not established. Accordingly, in the present invention, a second resumption procedure can be explicitly configured for SRB2 and SRB4. A second resumption procedure is not explicitly configured for SRB1 and SRB3. If a second resumption procedure is configured for at least one radio bearer, a second resumption procedure is implicitly configured for SRB1. A second resumption procedure is not configured for SRB3 under any conditions.

In step 1d-14, the terminal performs the SuspendConfig operation set. The SuspendConfig operation set is applied at a predetermined first or second time point. For the SuspendConfig operation set is performed, the following operations are sequentially performed.

<SuspendConfig Operation Set>
1. Apply suspendConfig.
2. Reset MAC.
3. Reset SRB1's RLC entity.
4. All SRBs and DRBs are suspended.
5. Start T380 set to t380.
6. Enter RRC_INACTIVE state.

The terminal applies the first time point for SuspendConfig operation set when the second resume related information is included, and the second time point if not included.

The first time point is as follows.

Earlier time point between a time point at which 100 ms has elapsed since receiving the RRCRelease message and a time point at which the lower layer successfully acknowledged the reception of the RRCRelease message.

The second time point is as follows.

Earlier time point between a time point at which 60 ms has elapsed since receiving the RRCRelease message and a time point at which the lower layer successfully acknowledged the reception of the RRCRelease message.

Different time points are used because the reliability of the RRC Release message including the second resume-related information should be higher than that of the RRC Release message not including the second resume information.

In step 1d-15, the terminal moves to a new cell. The terminal may compare the radio signal quality of the serving cell and the neighboring cell to reselect the neighboring cell having a better radio signal quality. Alternatively, a cell in which the radio signal quality is greater than or equal to a certain threshold may be selected.

In steps 1d-17, the terminal receives system information including SIB1 in a new cell. The SIB1 may include at least two types of information below.

<SIB1>
1. The value of t319
2. 1-bit information indicating whether the second resume procedure is allowed (or whether the second resume procedure is configured or possible).

If the second resume procedure is allowed, the following information is included and broadcast in system information (hereinafter, SIBX) other than SIB1.

<SIBX>
1. Data volume threshold of the second resume procedure (hereinafter, referred to as common data threshold)
2. Reference signal received power threshold of the second resume procedure (hereinafter, referred to as a common reference signal received power threshold)
3. Random access transmission resource information for the second resume procedure.
4. t319ext The terminal receives the SIBX if there is at least one radio bearer configured with a second resume procedure, i.e., if the second resume procedure is configured for at least one DRB or if the second resume procedure is configured for SRB2 or SRB4.

The terminal receiving the necessary system information including SIB1 performs the RRC_INACTIVE operation shown in Table 4 in the cell.

In step 1d-19, an event that triggers the resume procedure occurs. When the upper layer or AS requests the resumption of the suspended RRC connection or when new data occurs, the resume procedure may be triggered.

In step 1d-21, the terminal triggers one of the first resume procedure and the second resume procedure. If any one of the first resumption condition sets is satisfied, the first resume procedure is triggered.

<First Resume Condition Set>
1. The upper layer requests the resumption of the suspended RRC connection.
2. RAN paging including the first identifier is received.
3. RNA update occurs.
4. Data has been generated in the radio bearer that is allowed to trigger the second resumption procedure, but at least one of the second resume condition set is not satisfied.

If all of the second resume condition sets are satisfied, the second resume procedure is triggered.

<Second Resume Condition Set>
1. Data available for transmission is generated in a bearer belonging to the first bearer set.
2. The amount of data available for transmission from the bearer belonging to the first bearer set is less than the final data threshold.
3. The reference signal received power of the current serving cell is higher than the final reference signal received power threshold.
4. The current serving cell provides transmission resource for the second resume procedure.

A radio bearer that allows to trigger second resume procedure is DRB a second resume procedure is allowed and SRB a second resumption procedure is allowed. SRB3 does not allow the second resume procedure, and SRB2 and SRB4 are indicated by explicit information whether the second resume procedure is allowed. When the second resume procedure is allowed in at least one radio bearer, the second resume procedure is automatically allowed in the SRB1.

The final data threshold is the lower of the dedicated data threshold and the common data threshold or alternatively the dedicated data threshold, if there are both dedicated data thresholds and common data thresholds. If there is only one, it is the final data threshold. Alternatively, if there are both dedicated data thresholds and common data thresholds, the common data threshold is the final data threshold, and if there is only one, it is the final data threshold.

The final reference signal received power threshold is a higher of the dedicated reference signal received power threshold and the common reference signal received power threshold or the dedicated reference signal received power threshold, if there are both dedicated reference signal received power threshold and common reference signal received power threshold. If there is only one, it is the final data threshold. Or, if there are both dedicated reference signal received power threshold and common reference signal received power threshold, the common reference signal received power threshold is the final reference signal received power threshold, and if there is only one, it is the final data threshold.

When at least one of the first condition set is satisfied and all of the second condition sets are satisfied, that is, when both the first resume procedure and the second resume procedure are triggered, the terminal selects the second resume procedure.

In step 1d-23, the terminal performs a first resume procedure or a second resume procedure with the base station.

Figure 1E:
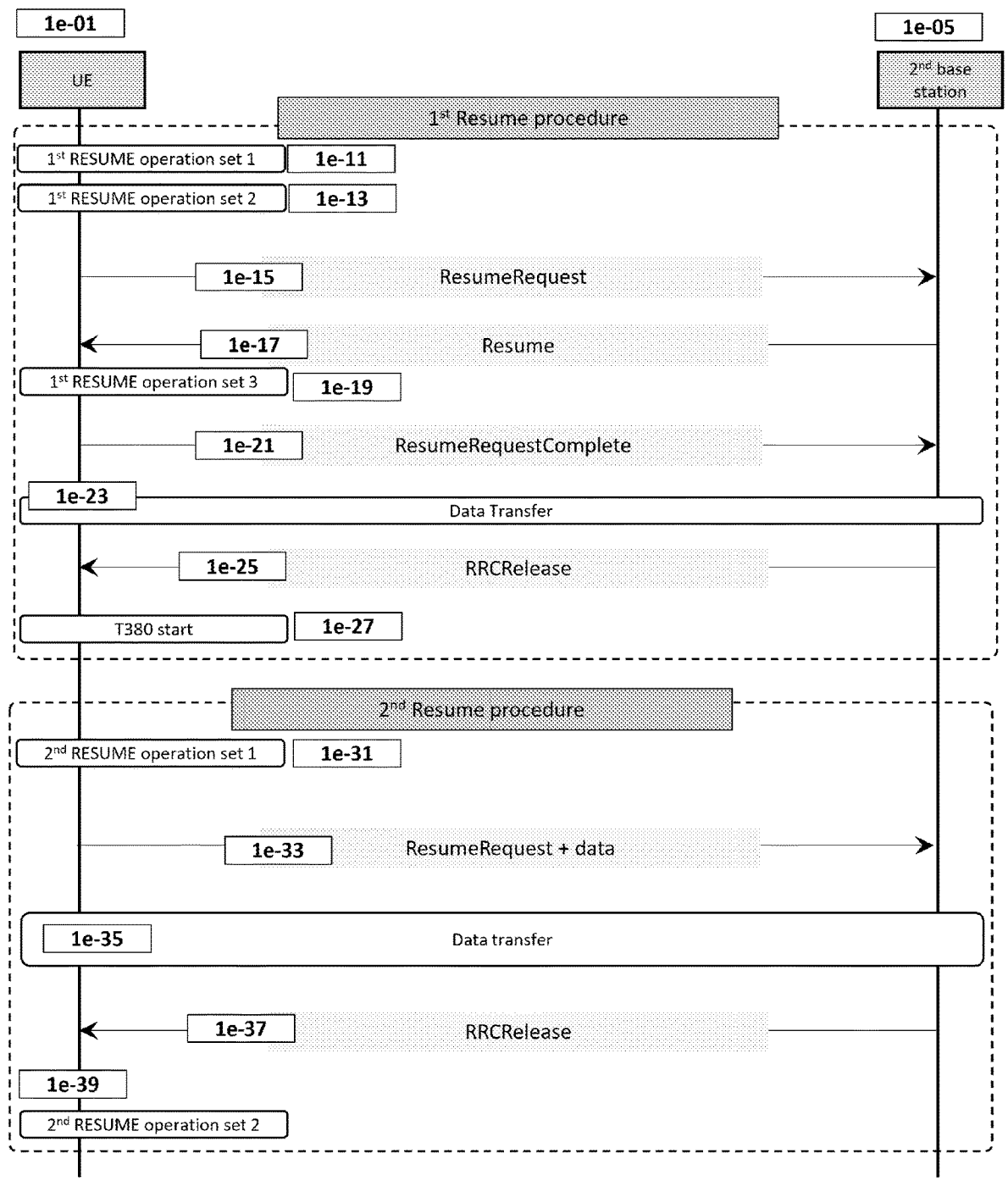
FIG. 1E is a diagram illustrating a first resume procedure and a second resume procedure according to an embodiment of the present invention.

FIG. 1E is a diagram illustrating a first resume procedure and a second resume procedure according to an embodiment of the present invention.

The first resumption procedure is as follows.

In step 1e-11, the terminal performs the first resume operation set 1. The first resume operation set 1 is operations taken when the first resume procedure is started. By performing the first operation set 1, the terminal may receive a downlink control message from the base station through SRB1.

<First Resume Operation Set 1>
1. Apply default SRB1 configuration.
2. Apply default MAC Cell Group configuration
3. Start T319 set to t319 received from SIB1.

The default SRB1 configuration is as follows.

TABLE 5

| Name | Value | | |
|---|---|---|---|
| | SRB1 | SRB2 | SRB3 |
| PDCP-Config | | | |
| t-Reordering | | infinity | |
| RLC-Config CHOICE | | Am | |
| ul-AM-RLC | | | |
| sn-FieldLength | | size12 | |
| t-PollRetransmit | | ms45 | |
| pollPDU | | infinity | |
| pollByte | | infinity | |
| maxRetxThreshold | | t8 | |
| dl-AM-RLC | | | |
| sn-FieldLength | | size12 | |
| t-Reassembly | | ms35 | |
| t-StatusProhibit | | ms0 | |
| logicalChannelIdentity | 1 | 2 | 3 |
| LogicalChannelConfig | | | |
| priority | 1 | 3 | 1 |
| prioritisedBitRate | | infinity | |
| logicalChannelGroup | | 0 | |

The default MAC Cell Group configuration is as follows.

TABLE 6

| Name | Value |
|---|---|
| MAC Cell Group configuration | |
| bsr-Config | |
| periodicBSR-Timer | sf10 |
| retxBSR-Timer | sf80 |
| phr-Config | |
| phr-PeriodicTimer | sf10 |
| phr-ProhibitTimer | sf10 |
| phr-Tx-PowerFactorChange | dB1 |

T319 set to t319 is a timer to perform follow-up measures, for example, transition to RRC_IDLE, etc., when the first resume procedure fails. T319 set to t319 is stopped when RRCResume is received. If the RRCResume is not received until the T319 set to t319 expires, the terminal performs the T319 expiration operation set.

<T319 Expiration Operation Set>
1. Reset MAC.
2. Discard UE Inactive AS Context.
3. Release suspendConfig.
4. Discard the security key.
5. Release all RLC entities, PDCP entities, and SDAP entities.
6. Transition to RRC_IDLE and perform cell selection operation.

In step 1e-13, the terminal performs the first resume procedure operation set 2. The first resume procedure operation set 2 is operations taken before transmitting the ResumeRequest.

<First Resume Procedure Operation Set 2>
0. Restore RRC configurations of UE Inactive AS context except masterCellGroup and PDCP-config.
1. ResumeMAC-I calculation: Calculate a 16-bit message verification code using the first security key (a security key used in the RRC_CONNECTED state or a security key used at the time of receiving RRC Release).
2. Deriving the second base station security key using the second base station security key. From the second base station security key, the second security key, the third security key, the fourth security key, and the fifth security key are derived.
3. All radio bearers except SRB0 are configured to use second security key and third security key or fourth security key and fifth security key.
3. Reestablish the PDCP entity of SRB1.
4. Resume SRB1.

In step 1e-15, the terminal transmits a ResumeRequest message to the second base station. The MAC PDU containing the ResumeRequest message does not include data from other radio bearers. ResumeRequest includes the information below.

<ResumeRequest>
1. The first identifier or the second identifier: an identifier indicated in the system information among the first and second identifiers given in SuspendConfig is included.
2. ResumeMAC-I: 16-bit message verification code to ensure integrity of the resume request message. The terminal calculates the resume MAC-I using the previous security key (a security key used in the RRC_CONNECTED state or a security key used at the time of receiving the RRC Release).
3. resumeCause: Indicating one of emergency, highPriorityAccess, mt-Access, mo-Signalling, mo-Data, mo-VoiceCall, mo-VideoCall, mo-SMS, ma-Update, mps-PriorityAccess, mcs-PriorityAccess and smallDataTransfer The terminal performing the first resume procedure selects one of the remaining values except for smallDataTransfer as the resumeCause. This is to enable the base station to determine whether the second resume procedure is performed through the resumeCause.

In step 1e-17, the terminal receives the RRC Resume. RRCResume includes the following information.
<RRCResume>
1. MasterCellGroup: CellGroupConfig for masterCellGroup includes RLC bearer information, MAC configuration information, PHY configuration information, and SpCell configuration information.
2. RadioBearrConfig: It is radio bearer configuration information and includes SRB configuration information and DRB configuration information.

In step 1e-19, the terminal performs the first resume procedure operation set 3.

<First Resume Procedure Operation Set 3>
1. Stop T319.
2: Stop T380.
3: Restore and apply masterCellGroup of UE Inactive AS Context
4: Apply CellGroupConfig and radioBearerConfig in RRCResume
5. Resume SRB2, SRB3, and all DRBs.
6. Transition to RRC_CONNECTED state.
7. Stop cell reselection procedure.

In step 1e-21, the terminal transmits an RRCResumeComplete message to the second base station. The RRCResumeComplete message includes PLMN identifier information selected by the terminal.

In step 1e-23, the terminal and the second base station transmit and receive data. In this case, the terminal may transmit a MAC CE such as BSR or PHR to the base station together. When the BSR trigger condition is satisfied, the terminal multiplexes the BSR in the uplink MAC PDU and transmit the MAC PDU. When the PHR trigger condition is satisfied, the terminal multiplexes the PHR MAC CE in the uplink MAC PDU and transmit the MAC PDU. BSR trigger conditions include arrival of new data with high priority and expiration of periodic timers. PHR trigger conditions include change of reference signal received power more than a predefined threshold, activation of a new secondary cell, and the like.

In step 1e-25, when data transmission/reception with the terminal is completed, the second base station transmits an RRC Release including SuspendConfig to the terminal to transition the terminal to the RRC_INACTIVE state.

In step 1e-27, the terminal receiving the RRCRelease message including SuspendConfig starts T380.

The second resume procedure is as follows.

In steps 1e-31, the terminal performs the second resume operation set 1. The second resume operation set 1 is operations taken when the second resume procedure is triggered as follows. By performing the second resume operation set 1, the terminal may receive a downlink control message from the base station through the SRB1 and transmit uplink data of the radio bearer (or data transmission in the INACTIVE state, or in which the second resume procedure is configured).

<Second Resume Operation Set 1>
0: Restore all RRC configuration of UE Inactive AS Context (including radio bearer settings of the first set of bearers, masterCellGroup, and PDCP-config).
1. start T319ext set to t319ext
2. stop T380
3. ResumeMAC-I calculation: A 16-bit MAC-I is calculated using the previous K_RRCint, that is, the first security key (K_RRCint used in the previous RRC_CONNECTED state or K_RRCint used at the time of receiving RRCRelease).
4. Deriving the second base station security key using the first base station security key and the NCC. From the second base station security key, the second security key, the third security key, the fourth security key, and the fifth security key are derived.
5. Configure the first bearer set to apply the second security key and the third security key or the fourth security key and the fifth security key.
6. Reestablish the PDCP entity of the first bearer set.
7. Resume the radio bearer of the first bearer set.
8. Stop cell reselection procedure
9. Start the second cell reselection procedure.

T319ext set to t319ext is a timer to perform follow-up measures, for example, transition to RRC_IDLE, etc., when the second resume procedure fails. T319, T319ext, and T380 have the following characteristics.

<T319ext Expiration Operation Set>
1. Reset MAC
2. Keep UE Inactive AS Context
3. Keep suspendConfig

TABLE 7

| First resume | | |
| --- | --- | --- |
| | T380 | T319 |
| Configured by | RRCRelease | SIB1 |
| Start | Upon reception of RRCRelease | After start of first reconfiguration procedure, between the time point when configuration received from SIB1 is applied and the time point when SRB1 resumes |
| Stop | Upon reception of RRCResume and before applying cell group configuration | Upon reception of RRCResume and before applying cell group configuration |
| Upon expiration | Initiating periodic RNA update in the current cell | T319 expiry operation set |

| Second resume | | |
| --- | --- | --- |
| | T380 | T319ext |
| Configured by | RRCRelease | SIB X |
| Start | Upon reception of RRCRelease | After start of second reconfiguration procedure, between the time point when SRB1 configuration stored in UE Inactive AS Context is applied and the time point when SRB1 resumes |
| Stop | After start of second reconfiguration procedure, between the time point when SRB1 configuration stored in UE Inactive AS Context is applied and the time point when SRB1 resumes | Upon reception of RRCRelease or before applying cell group configuration |
| Upon expiration | Determining whether to initiate periodic RNA update in the current cell | T319ext expiry operation set |

In the first resume procedure, T380 and T319 stops before configuring cell group information after receiving the RRCResume message to prevent unnecessary subsequent operation due to the timer expiration by stopping the timers as a first operation after receiving the RRCResume message.

In the first resume procedure, starting T319 between the time point when the default SRB1 configuration is applied and the time point when SRB1 resumes is to start T319 as close as possible to the time point when SRB1 becomes available.

In the second resume procedure, starting T319ext between the time point when SRB1 configuration stored in UE Inactive AS Context is applied and the time point when SRB1 resumes is to start T319ext as close as possible to the time point when SRB1 becomes available.

In the second resume procedure, starting T380 between the time point when SRB1 configuration stored in UE Inactive AS Context is applied and the time point when SRB1 resumes is to start T380 as close as possible to the time point when T319ext starts so that the processing load for timer handling in UE is reduced.

The time point when SRB1 configuration stored in UE Inactive AS Context is applied and the time point when radio bearer configuration for first bearer set stored in UE Inactive AS Context is applied are same.

If the RRCResume is not received until the T319ext set to t319ext expires, the terminal may perform the T319ext expiration operation set or the T319 expiration operation set. The base station may set in SuspendConfig or in system information which one to select between the T319ext expiration operation set and the T319 expiration operation set.

4. Discard first base station security key and first security key in UE and store second base station security key and third security key
5. Suspend all SRBs and DRBs
6. Start T380 set to t380
7. Stop second cell reselection procedure
8. Start cell reselection procedure
9. Perform RNA update after selecting a suitable cell The first bearer set is a set of radio bearers for which the second resume procedure is explicitly or implicitly configured and consists of SRB1 and radio bearers related to the second resume procedure. The radio bearer related to the second resume procedure refers to a radio bearer in which the second resume procedure is explicitly allowed or a radio bearer in which the second resume procedure is explicitly configured.

Stopping the cell reselection procedure means stopping the existing cell reselection procedure performed before the second resume procedure starts.

UE preferentially selects, in the existing cell reselection procedure, a frequency to camp on by considering cell reselection priority provided by base station, ranks each cell of the selected frequency by considering reference signal received power and various offsets, and reselects a highest ranked cell.

When the second cell reselection procedure starts, the terminal stops using the cell reselection priority and offsets indicated by the base station and uses the following parameters.

<Second Cell Reselection Procedure>
  1. Increase the cell reselection priority of the current serving frequency to the highest priority.
  2. Increase the first Qhyst by a predetermined value. Or apply the 2nd Qhyst.

When the terminal determines the cell ranking, the current serving cell is weighted by Qhyst. That is, the ranking is determined by adding Qhyst to the reference signal received power of the current serving cell. The first Qhyst is included in the SIB2 and broadcasted. The second Qhyst or the predetermined value is included in the SIBX and broadcasted.

In steps 1e-33, the terminal transmits a MAC PDU including a first SDU including a ResumeRequest message and data of first bearer set (or data of a bearer in which a second resume procedure is configured) to the second base station. The terminal performing the second resume procedure selects smallDataTransfer as ResumeCause. The terminal may include a priority-based BSR MAC CE and a PHR MAC CE in the MAC PDU. If the BSR/PHR inclusion condition is satisfied and the BSR/PHR cancellation condition is not satisfied, the terminal includes and transmits the priority-based BSR MAC CE and the PHR MAC CE in the MAC PDU. The terminal transmits MAC PDUs that do not include the priority-based BSR and PHR when the BSR/PHR cancellation condition is satisfied even if the BSR/PHR inclusion condition is satisfied.

<BSR/PHR Inclusion Condition>
  There is more data for transmission after transmission of the MAC PDU (or first uplink MAC PDU of the second resume procedure) including ResumeRequest, or uplink grant (or first uplink grant of the second resume procedure) for transmission of MAC PDU including ResumeRequest does not accommodate all pending data available for transmission.

<BSR/PHR Cancellation Condition>
  An uplink grant (or the first uplink grant of the second resume procedure) for transmission of MAC PDU including ResumeRequest can accommodate all pending data available for transmission if at least one of a triggered BSR and corresponding subheader or a triggered PHR are not included in the MAC PDU but cannot accommodate all pending data available for transmission if both triggered BSR and corresponding subheader and triggered PHR and corresponding PHR are included in the MAC PDU.

In steps 1e-35, the terminal and the base station transmit and receive data of the first bearer set. Data of the first bearer set is scheduled by C-RNTI, and the terminal monitors a frequency region and a time interval, indicated in SIBX, for transmitting and receiving small amounts of data (or for transmitting and receiving data in the second resume procedure).

When the data transmission is completed, the base station determines to terminate the second resume procedure.

In steps 1e-37, the second base station transmits an RRCRelease including SuspendConfig to the terminal to terminate the second resume procedure. When receiving an RRCRelease including SuspendConfig, the terminal performs the second resume procedure operation set 2 to terminate the second resume procedure.

Figure 2:
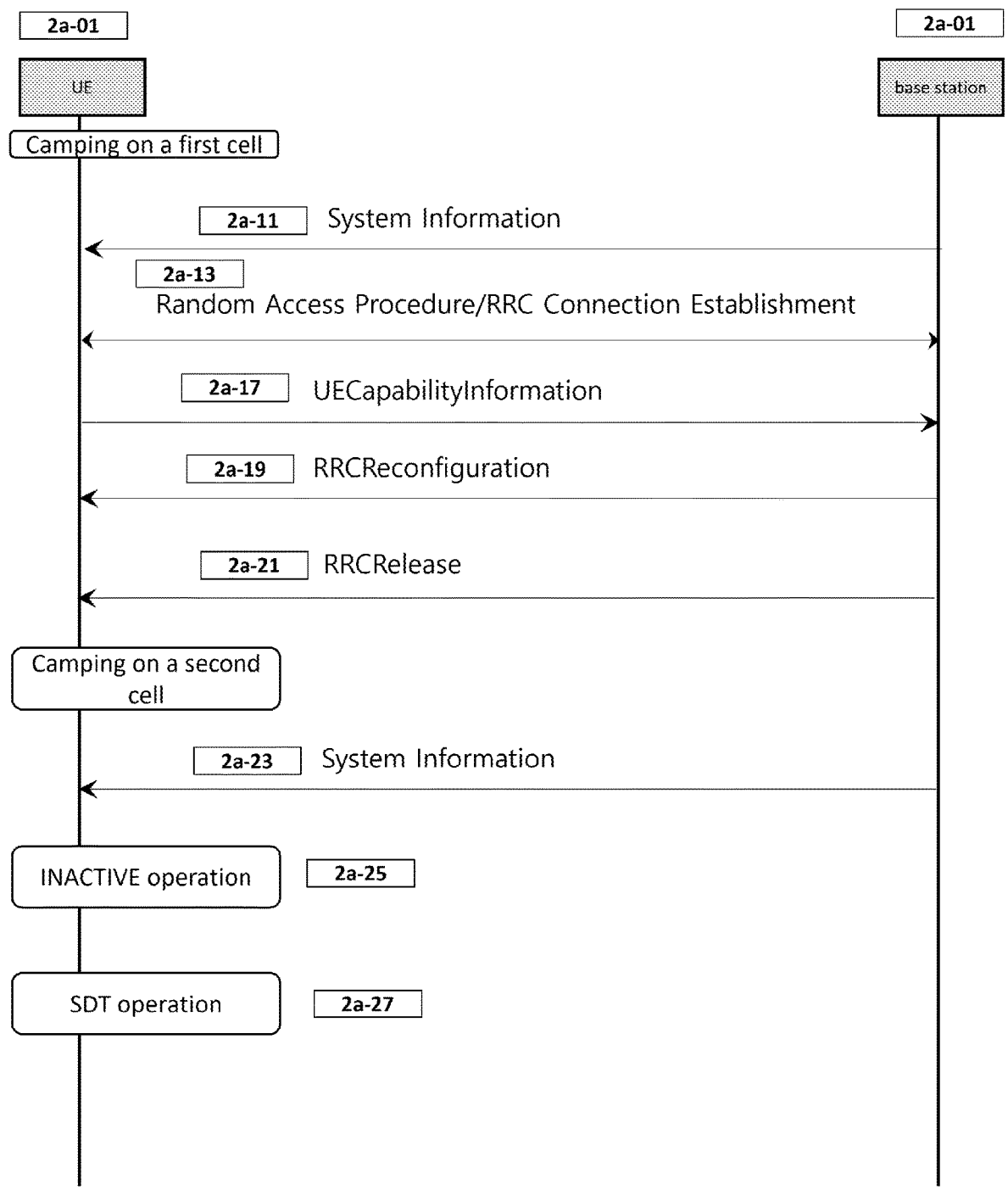
FIG. 2 is a diagram illustrating operations of a terminal and a base station according to an embodiment of the present invention.

<Second Resume Operation Set 2>
  1. Stop monitoring frequency region and time interval for small data transmission indicated in SIBX
  2. Reset MAC
  3. Update suspendConfig
  4. Discard first base station security key and first security key in UE and store second base station security key and third security key
  5. Suspend all SRBs and DRBs except SRB0
  6. Start T380 set to t380
  7. Stop second cell reselection procedure
  8. Start cell reselection procedure FIG. 2 is a diagram illustrating operations of a terminal and a base station according to an embodiment of the present invention.

Upon power-on, UE performs cell selection and camp on a first cell.

In 2a-11, UE receives a system information (MIB, SIB1, SIB2 and other SIBS) in the first cell.

In 2a-13, UE and the GNB performs random access procedure based on the system information.

The UE establishes an RRC connection with the base station. The terminal and the base station exchange RRCRequest messages, RRCSetup messages, and RRCSetupComplete messages through the random access process. When the terminal receives the RRCSetup message from the base station, the RRC connection is established.

In 2a-17, UE transmits and GNB receives UECapabilityInformation.

UECapabilityInformation includes a capability information on SDT and a plurality capability information on SRS. Each of the plurality of capability information on SRS indicates whether UE supports SRS transmission in a specific frequency band in RRC_INACTIVE state.

GNB determines the configuration to be applied to the UE based on the UECapabilityInformation.

GNB generates RRCReconfiguration message including the determined configuration.

In 2a-19, GNB transmits and UE receives RRCReconfiguration message.

A RRCReconfiguration message includes a plurality of BWP-Downlink and a plurality of BWP-Uplink and a firstActiveDownlinkBWP-Id and a bwp-InactivityTimer and a defaultDownlinkBWP-Id and a BWP-DownlinkDedicated for the initial DL BWP and a BWP-UplinkDedicated for the initial UL BWP.

A BWP-Downlink IE includes a bwp-Id and a BWP-DownlinkCommon and a BWP-DownlinkDedicated.

A BWP-Uplink IE includes a bwp-Id and a BWP-UplinkCommon and a BWP-UplinkDedicated.

The bwp-Id is an integer between 0 and 4. bwp-Id 0 is used only for the BWP indicated in SIB1. bwp-Id1~4 can be used for the BWPs indicated in the RRCReconfiguration message.

BWP-DownlinkCommon IE includes following information: Frequency domain location and bandwidth of this bandwidth part, subcarrier spacing to be used in this BWP, cell specific parameters for the PDCCH(PDCCH-ConfigCommon) of this BWP, cell specific parameters for the PDSCH(PDSCH-ConfigCommon) of this BWP.

BWP-UplinkCommon IE includes following information: Frequency domain location and bandwidth of this bandwidth part, subcarrier spacing to be used in this BWP, cell specific parameters for the PUCCH(PUCCH-ConfigCommon) of this BWP, cell specific parameters for the PUSCH (PUSCH-ConfigCommon) of this BWP, Configuration of cell specific random access parameters(RACH-ConfigCommon).

BWP-DownlinkDedicated is used to configure the dedicated (UE specific) parameters of a downlink BWP. It includes PDCCH-Config of this BWP, PDSCH-Config of this BWP.

The BWP-UplinkDedicated is used to configure the dedicated (UE specific) parameters of an uplink BWP. It includes PUCCH-Config of this BWP, PUSCH-Config of this BWP, ConfiguredGrantConfig of this BWP and SRS-config of this BWP.

firstActiveDownlinkBWP-Id contains the ID of the DL BWP to be activated upon performing the RRC (re-)configuration.

DefaultDownlinkBWP-Id is the ID of the downlink bandwidth part to be used upon expiry of the BWP inactivity timer.

BWP-InactivityTimer is the duration in ms after which the UE falls back to the default Bandwidth Part RRCReconfiguration message may further include DRB-ToAddModList IE and SRB-ToAddModList IE.

DRB-ToAddModList IE includes a plurality of DRB-ToAddMod IE. A DRB-ToAddMod IE includes PDCP configuration and SDAP configuration and drb-Identity. UE establishes a plurality of DRBs based on the DRB-ToAddModList IE.

SRB-ToAddModList IE includes a plurality of SRB-ToAddMod IE. A SRB-ToAddMod IE includes PDCP configuration and srb-Identity. UE establishes a plurality of SRBs based on the SRB-ToAddModList IE.

The RRCReconfiguration message may include a plurality of SRS configuration (i.e., SRS-config).

GNB and UE performs data transfer via DRBs and logical channels configured based on the RRCReconfiguration message.

GNB and UE performs RRC message transfer via SRBs and logical channels configured based on the RRCReconfiguration (or RRC Setup).

GNB and UE performs data transfer based on configured grant. GNB and UE performs SRS transmission/reception based on SRS-config.

At some point of time, GNB decides state transition from RRC_CONNECTED to RRC_INACTIVE.

GNB generates RRCRelease message comprising suspendConfig.

In 2a-21, GNB transmits and UE receives the RRCRelease message. The RRCRelease message includes a SuspendConfig IE.

The SuspendConfig IE includes following fields in non-extended part:

<Fields Included in Non-Extended Part of SuspendConfig>
1. fullI-RNTI: an identifier of a terminal that may be included in the ResumeRequest when a state transition to RRC_CONNECTED is made. It has a 40-bit length.
2. shortI-RNTI: an identifier of a terminal that may be included in the Resume Request when a state transition to RRC_CONNECTED is made. It has a 24-bit length.
3. ran-Paging Cycle: Paging cycle to be applied in RRC_INACTIVE state.
4. ran-Notification AreaInfo: Configuration information of a ran-Notification Area consisting of a list of cells and the like. The terminal initiates a resume procedure when the ran Notification Area is changed.
5. t380: Timer related to the periodic resumption procedure.
6. NextHopChangingCount (NCC): Counter used to derive new security keys after performing the resume procedure.

If GNB decides to enable SDT for the UE, the suspendConfig IE may include SDT-Config IE in the first extended part. SDT-Config IE includes following fields:

SDT-DRB-List indicates the ID(s) of the DRB(s) that are configured for SDT.

SDT-SRB2-Indication indicates whether SRB2 is configured for SDT or not.

SDT-MAC-PHY-CG-Config field indicates CG-SDT specific configuration. sdt-MAC-PHY-CG-Config field includes following fields.

CG-SDT-TimeAlignmentTimer: this field includes TimeAlignmentTimer IE. UE uses this value for configured grant related operation in RRC_INACTIVE.

CG-SDT-TA-ValiditationConfig: this field includes configuration for the RSRP based TA validation. It further includes information on number of SSBs to average for CG-SDT validation and on the RSRP threshold for CG-SDT resource validation.

CG-SDT-Config-Initial-BWP-NUL: this field includes PUCCH-Config IE and PUSCH-Config IE and a plurality of ConfiguredGrantConfig IEs. UE applies those IEs for configured grant related operation in NUL in RRC_INCATIVE.

CG-SDT-Config-Initial-BWP-SUL: this field includes PUCCH-Config IE and PUSCH-Config IE and a plurality of ConfiguredGrantConfig IEs. UE applies those IEs for configured grant related operation in SUL in RRC_INCATIVE.

CG-SDT-Config-Initial-BWP-DL: this field includes PDCCH-Config IE and PDSCH-Config IE. UE applies these IEs for configured grant related operation in RRC_INACTIVE.

CS-RNTI: this field includes RNTI value for configured uplink grant during RRC_INACTIVE state. The RNTI value is 16 bit long.

If GNB determines to enable SRS transmission The suspendConfig IE includes SRS-PosRRC-InactiveConfig IE in the second extended part.

Srs-Config: this field includes SRS-Config for RRC_INACTIVE state.

BWP: this field is BWP configuration for SRS for Positioning during the RRC_Inactive state. If the field is absent UE is configured with an SRS for Positioning associated with the initial UL BWP and transmitted, during the RRC_INACTIVE state, inside the initial UL BWP with the same CP and SCS as configured for initial UL BWP.

SRS-TimeAlignmnetTimer: This field includes TimeAlignmentTimer IE for SRS for positioning transmission during RRC_Inactive State.

SRS-PosRRC-ValiditationConfig: this field includes configuration for the RSRP based TA validation for SRS transmission. It further includes information on number of SSBs to average for SRS resource validation and on the RSRP threshold for SRS resource validation.

C-RNTI: this field includes RNTI value for SRS activation/deactivation during RRC_INACTIVE state. The RNTI value is 16 bit long.

If suspendConfig is received (or if susepndConfig is included in the RRCRelease), UE performs following operations.

UE applies suspendConfig in the non-extended part (or a first IE group).

UE reset MAC.

UE applies suspendConfig in the extended part (or a second IE group)

UE re-establishes RLC entities for SRB1.

UE suspends all SRB(s) and DRB(s) except SRB0.

UE enters RRC_INACTIVE and perform cell selection.

During the cell selection process, UE selects a suitable cell and camp on it. The selected suitable cell is a second cell. The first cell and the second cell could be same or different.

In 2a-23, UE receives system information from the second cell. If the first cell and the second cell are same, UE receives first system information and applies stored second system information. If the first cell and the second cell are different, UE receives first system information and second system information. The first system information is MIB. The second system information comprises SIB1 and other relevant system information.

In 2a-25, UE performs INACTIVE operation in the second cell. UE and GNB may perform SRS transmission/reception during INACTIVE state based on RRCRelease message and MAC CE.

In 2a-27, UE initiates SDT procedure in the second cell. During the SDT procedure, UE and GNB may perform configured uplink grant transmission/reception based on RRCRelease message.

Upon MAC reset, UE performs followings.
UE stop (if running) all timers;
UE consider all timeAlignmentTimers as expired;
UE stop, if any, ongoing Random Access procedure;
UE flush the soft buffers for all DL HARQ processes;

During the random access procedure, UE starts a timeAlignmentTimer when a Timing Advance Command is received in a Random Access Response message. The timeAlignmentTimerCommon field included in SIB1 is applied to the timeAlignmentTimer.

UE receives RRC Setup message during the random access procedure. RRCSetup (or RRCReconfiguration) message may include one or more timeAlignmentTimer fields. UE applies a first timeAlignmentTimer field to the timeAlignmentTimer when the timer restarts. The first timeAlignmentTimer field is the timeAlignmentTimer field associated with tag-Id zero.

The UE, when a Timing Advance Command MAC CE or a Absolute Timing Advance Command MAC CE is received, applies the Timing Advance Command for the indicated TAG and start or restart the timeAlignmentTimer associated with the indicated TAG.

The Timing Advance Command MAC CE is identified by MAC subhead with LCID. The Timing Advance Command MAC CE consists of 2 bit TAG Identity field and 6 bit Timing Advance Command field.

The Absolute Timing Advance Command MAC CE is identified by MAC subheader with eLCID. The Absolute Timing Advance Command MAC CE consists of 4 reserved bits and 12 bit Timing Advance Command.

The Timing Advance Command in a Random Access Response message indicates the index value used to control the amount of timing adjustment. The index indicates an absolute value. The length of the field is 12 bit.

The Timing Advance Command in a Timing Advance Command MAC CE indicates the index value used to control the amount of timing adjustment. The index indicates an relative value comparing to the current amount of timing adjustment. The length of the field is 6 bits.

The Timing Advance Command in a Absolute Timing Advance Command MAC CE indicates the index value used to control the amount of timing adjustment. The index indicates an absolute value. The length of the field is 12 bit.

When a timeAlignmentTimer associated with the PTAG expires, UE performs followings.
UE flush all HARQ buffers for all Serving Cells;
UE releases PUCCH for all Serving Cells, if configured;
UE release SRS for all Serving Cells, if configured;
UE clears any configured downlink assignments and configured uplink grants;
UE clears any PUSCH resource for semi-persistent CSI reporting;
UE considers all running timeAlignmentTimers as expired;

When a timeAlignmentTimer associated with an STAG expires, UE performs followings for all serving cells belonging to the TAG.
UE flushes all HARQ buffers;
UE releases PUCCH, if configured;
UE release SRS, if configured;
UE clears any configured downlink assignments and configured uplink grants;
UE clears any PUSCH resource for semi-persistent CSI reporting;

There are two types of transmission without dynamic grant:
Configured grant Type 1 where an uplink grant is provided by RRC, and stored as configured uplink grant;
Configured grant Type 2 where an uplink grant is provided by PDCCH, and stored or cleared as configured uplink grant based on L1 signalling indicating configured uplink grant activation or deactivation.

Type 1 and Type 2 are configured by RRC for a Serving Cell per BWP. Multiple configurations can be active simultaneously in the same BWP. For Type 2, activation and deactivation are independent among the Serving Cells.

RRC configures the following parameters when the configured grant Type 1 is configured:
CS-RNTI: CS-RNTI for retransmission;
Periodicity: periodicity of the configured grant Type 1;
TimeDomainOffset: Offset of a resource with respect to SFN=timeReferenceSFN in time domain;
TimeDomainAllocation: Allocation of configured uplink grant in time domain which contains startSymbolAndLength or startSymbol;
NRofHARQ-Processes: the number of HARQ processes for configured grant;
TimeReferenceSFN: SFN used for determination of the offset of a resource in time domain. The UE uses the closest SFN with the indicated number preceding the reception of the configured grant configuration.
FrequencyHopping: The value intraSlot enables 'Intra-slot frequency hopping' and the value interSlot enables 'Inter-slot frequency hopping'. If the field is absent, frequency hopping is not configured.
P0-PUSCH-Alpha: This field include an index indicating p0 value RRC configures the following parameters when the configured grant Type 2 is configured:
CS-RNTI: CS-RNTI for activation, deactivation, and retransmission;
Periodicity: periodicity of the configured grant Type 2;
NrofHARQ-Processes: the number of HARQ processes for configured grant;

The cs-RNTI is included in PhysicalCellGroupConfig IE or SuspendConfig IE.

periodicity, timeDomainOffset, timeDomainAllocation, nrofHARQ-Processes, frequencyHopping, p0-PUSCH-Alpha and timeReferenceSFN are included in an ConfiguredGrantConfig.

A ConfiguredGrantConfig IE can further include sdt-P0-PUSCH field if the ConfiguredGrantConfig IE is included in the second part of SuspendConfig of RRCRelease message. The value indicated in sdt-P0-PUSCH field instead of the value indicated in P0-PUSCH field in PUSCH-Config IE is applied for the initial transmission based on the configured grant in RRC_INACTIVE state A RRCReconfiguration message include one Physical-CellGroupConfig IE and a plurality of ConfiguredGrant-Config IEs.

A RRCRelease message include zero or one cs-RNTI field. A RRCRelease message include zero or one or more ConfiguredGrantConfig.

The SRS configuration may be provided for each UL BWP, and the SRS configuration consists of one or more SRS-PosResourceSet (hereinafter, SRS positioning resource set). One SRS positioning resource set consists of one or more SRS-PosResource (hereinafter, SRS positioning resource).

The SRS positioning resource is defined by srs-PosResourceId (SRS positioning resource identifier), startPosition, nrofSymbols, freqDomainShift, freqHopping, periodicityAndOffset-sp, spatialRelationInfoPos, and the like.

StartPosition and nrofSymbols indicate the start position of a symbol in which SRS is transmitted and the number of symbols in which SRS is transmitted in the positioning SRS slot.

FreqDomainShift and freqHopping define the frequency resource through which the SRS is transmitted in relation to the frequency domain of the corresponding BWP.

PeriodicityAndOffset-sp indicates the periodicity and the slot at which the positioning SRS slot starts. The positioning SRS slot means a slot in which a positioning SRS resource is configured or a slot in which a positioning SRS is transmitted.

SpatialRelationInfoPos defines a spatial domain transmission filter to be applied to positioning SRS transmission and may be set to a downlink reference signal index of a serving cell, an SSB index of a neighboring cell, and the like. spatialRelationInfoPos is set always to serving cell index 0 (i.e., PCell) for RRC_INACTIVE UE. Any serving cell index or neighboring cell can be used for RRC_CONNECTED SRS positioning resource set consists of SRS positioning resource set identifier, SRS positioning resource identifier list, ResourceType, alpha, p0, pathlossReferenceRS-Pos.

SRS positioning resource identifier list is the list of SRS positioning resource identifiers composing the SRS positioning resource set.

ResourceType indicates one of "periodic" and "semi-persistent" and "aperiodic". In the present disclosure, a semi-persistent SRS positioning resource set will be described as an example. For SRS positioning resource set of which ResourceType is indicated as semi-persistent, SRS transmission of SRS positioning resource set starts only after a specific control message instructs transmission. Only periodic or semi-persistent are applicable for the UE in RRC_INACTIVE.

Alpha, p0 and pathlossReferenceRS-Pos are parameters for transmission power control of positioning SRS. alpha and p0 are power offsets that are added when determining positioning SRS transmission power, and pathlossReferenceRS-Pos provides path loss when determining positioning SRS transmission power. is the reference signal.

At some point of time, the UEUE receives a Positioning SRS Activation/Deactivation MAC CE instructing to start transmission of a specific SRS positioning resource set from the GNB.

The Positioning SRS Activation/Deactivation MAC CE consists of an A/D field, a Cell ID field, a BWP ID field, a SUL field, and a Positioning SRS Resource Set ID.

The A/D field indicates whether to activate or deactivate the indicated SRS positioning resource set.

The Cell ID field indicates the identifier of the serving cell to which the SRS positioning resource set to be activated/deactivated belongs.

The BWP ID field indicates the identifier of the BWP to which the SRS positioning resource set to be activated/deactivated belongs.

The SUL field indicates whether the MAC CE is applied to a NUL carrier configuration or a SUL carrier configuration. Or it indicates whether the activated or deactivated SRS positioning resource set is an SRS positioning resource set of SUL or an SRS positioning resource set of NUL.

The Positioning SRS Resource Set ID field is an identifier of the SRS positioning resource set to be activated or deactivated.

NUL is normal uplink and SUL is supplementary uplink. One serving cell may have only NUL or may have NUL and SUL. The SUL is configured in the low frequency band comparing to the NUL to increase the uplink coverage of the cell.

The UE transmits a positioning SRS in the activated SRS positioning resource set. The UE transmits the positioning SRS from SRS positioning resources belonging to the SRS positioning resource set by applying the transmission power control parameter of the SRS resource set. The SRS positioning resources are periodically generated according to periodicityAndOffset-sp.

TimeAlignmentTimerCommon is a timer applied when the UE performs random access for RRC connection establishment procedure and RRC connection re-establishment procedure. When the UE receives the RAR, it starts driving the timer, and stops driving the timer when contention fails.

DownlinkConfigCommonSIB is a common downlink configuration of the serving cell. It consists of subfields such as FrequencyInfoDL-SIB and BWP-DownlinkCommon.

FrequencyInfoDL-SIB is a basic parameter of a downlink carrier. It consists of subfields such as a frequency band list and carrier bandwidth for each SCS.

BWP-DownlinkCommon is the configuration of the second downlink IBWP. It consists of subfields such as BWP, PDCCH-ConfigCommon, and PDSCH-ConfigCommon. The first IBWP has a frequency domain corresponding to the first CORESET #0 of the MIB and has subcarrier spacing indicated by the MIB. The first IBWP is the IBWP indicated by the MIB and receiving SIB1, the second IBWP is the IBWP indicated by the SIB1 and receiving the SIB2, paging, random access response message, and the like.

BWP is IE that configures general parameters of BWP. It consists of subfields such as locationAndBandwidth indicating the bandwidth and location of the BWP, and subcarrierSpacing indicating the SCS of the BWP.

PDCCH-ConfigCommon is the cell-specific PDCCH parameters of the BWP. It consists of subfields such as controlResourceSetZero, commonControlResourceSet, searchSpaceZero, commonSearchSpaceList, searchSpaceOtherSystemInformation, pagingSearchSpace, and ra-SearchSpace.

ControlResourceSetZero is defined as an integer between 0 and 15. It indicates one of the predefined CORESET #0 configurations. The controlResourceSetZero included in the MIB corresponds to the first CORESET #0, and the controlResourceSetZero included in the PDCCH-ConfigCommon of the servingCellConfigCommon of SIB1 corresponds to the second CORESET #0.

SearchSpaceZero is defined as an integer between 0 and 15. It indicates one of the predefined SS #0 configurations. The searchSpaceZero included in the MIB corresponds to the first SS #0, and the controlResourceSetZero included in the PDCCH-ConfigCommon of the servingCellConfigCommon of SIB1 corresponds to the second SS #0.

CommonControlResourceSet is a common CORESET defined by ControlResourceSet IE. It defines an additional CORESET that can be used for paging reception, random access response reception, system information reception, etc.

CommonSearchSpaceList is a list of common SSs. The common SS may be used for paging reception, random access response reception, system information reception, and the like.

SearchSpaceOtherSystemInformation is defined by the SS identifier IE. If it is 0, the second SS #0 is indicated, and if it is a value other than 0, one of the SSs defined in commonSearchSpaceList is indicated.

PagingSearchSpace is defined by the SS identifier IE. If it is 0, the second SS #0 is indicated, and if it is a value other than 0, one of the SSs defined in commonSearchSpaceList is indicated.

RA-SearchSpace is defined by the SS identifier IE. If it is 0, the second SS #0 is indicated. If it is a value other than 0, one of the SSs defined in the commonSearchSpaceList is indicated.

PDCCH-Config is used to configure UE specific PDCCH parameters such as control resource sets (CORESET), search spaces and additional parameters for acquiring the PDCCH.

It consists of fields such as controlResourceSetToAddModList, searchSpacesToAddModList and tpc-SRS.

ControlResourceSetToAddModList field includes a list of UE specifically configured Control Resource Sets (CORESETs) to be used by the UE.

SearchSpacesToAddModList field includes a list of UE specifically configured Search Spaces.

TPC-SRS field enables and configures reception of group TPC commands for SRS. tpc-SRS field includes SRS-TPC-CommandConfig IE. SRS-TPC-CommandConfig is used to configure the UE for extracting TPC commands for SRS from a group-TPC messages on DCI.

PDSCH-ConfigCommon is cell-specific PDSCH parameters of this BWP. It consists of a pdsch-TimeDomainAllocationList. The pdsch-TimeDomainAllocationList is a list composed of a plurality of pdsch-TimeDomainAllocations.

PDSCH-TimeDomainAllocation is a time domain relationship between the PDCCH and the PDSCH. It consists of subfields such as K0 and startSymbolAndLength. K0 is the slot offset between the DCI and the scheduled PDSCH. startSymbolAndLength is an index indicating a valid start symbol and length combination.

PCCH-Config is configuration related to paging. It consists of sub-fields such as the base station paging period, PF-related parameters, and P0-related parameters.

BCCH-config is a configuration related to system information. It consists of subfields such as modificationPeriodCoeff indicating the length of the modification period.

UplinkConfigCommonSIB is a common uplink configuration of the serving cell. It consists of subfields such as frequencyInfoUL, initialUplinkBWP, and timeAlignmentTimerCommon.

FrequencyInfoUL-SIB is a basic parameter of the uplink carrier. It consists of subfields such as a frequency band list and carrier bandwidth for each SCS.

BWP-UplinkCommon is the configuration of the second uplink IBWP. It consists of subfields such as BWP, rach-ConfigCommon, pusch-ConfigCommon, and pucch-ConfigCommon.

PDSCH-Config IE is used to configure the UE specific PDSCH parameters. It consists of dataScramblingIdentityPDSCH field and pdsch-TimeDomainAllocationList field and mcs-Table field and others.

DataScramblingIdentityPDSCH field indicates identifier used to initialize data scrambling (c_init) for PDSCH MCS-Table field indicates which MCS table the UE shall use for PDSCH. If the field is absent the UE applies the value 64QAM. value 64QAM means the MCS table for 64QAM. value 256QAM means the MCS table for 256QAM.

RACH-ConfigCommon is the cell-specific random access parameter of the BWP. It consists of subfields such as prach-ConfigurationIndex, msg1-FrequencyStart, preambleReceivedTargetPower, ra-ResponseWindow, preambleTransMax, msg1-SubcarrierSpacing, rsrp-ThresholdSSB, rsrp-ThresholdS SB-SUL and ra-ContentionResolutionTimer.

PRACH-ConfigurationIndex is a PRACH configuration index. One PRACH configuration corresponds to pattern information on a PRACH transmission opportunity in the time domain (information indicating in which symbol in which slot of which radio frame PRACH transmission is possible), a transmission format of a preamble, and the like.

MSG1-FrequencyStart is the offset from PRB0 of the lowest PRACH transmission opportunity. It is information indicating a PRACH transmission resource in the frequency domain. PRB0 is the lowest frequency PRB among PRBs of the corresponding carrier.

PreambleReceivedTargetPower is the target power level of the network receiving end. It is a parameter related to transmission power control during the random access procedure.

RA-ResponseWindow is the length of the random access response window expressed in the number of slots.

PreambleTransMax is the maximum number of random access preamble transmissions

MSG1-SubcarrierSpacing is PRACH's SCS. It is commonly applied to general terminals and RedCap UEs.

RSRP-ThresholdSSB is SSB selection criteria. The UE performs random access by selecting a preamble corresponding to the selected SSB.

RSRP-ThresholdSSB SUL is SUL selection criteria. The UE selects SUL carrier for random access procedure based at least in part on this threshold.

RA-ContentionResolutionTimer is the initial value of the contention resolution timer. Indicates the number of subframes.

PUSCH-ConfigCommon is cell-specific PUSCH parameters of this BWP. It consists of subfields like pusch-TimeDomainAllocationList. The pusch-TimeDomainAllocationList is a list composed of a plurality of pusch-TimeDomainAllocations.

PUSCH-Pusch-TimeDomainAllocation is a time domain relationship between the PDCCH and the PUSCH. It consists of subfields such as K2 and startSymbolAndLength. K2 is the slot offset between the DCI and the scheduled PUSCH. startSymbolAndLength is an index indicating a valid combination of start symbol and length.

The IE PUSCH-Config is used to configure the UE specific PUSCH parameters applicable to a particular BWP. It consists of dataScramblingIdentityPUSCH field, pusch-PowerControl field, pusch-TimeDomainAllocationList field, mcs-Table field and frequencyHopping field and others.

DataScramblingIdentityPUSCH field indicates an identifier used to initialize data scrambling (c_init) for PUSCH. If the field is absent, the UE applies the physical cell ID.

MCS-Table field indicates which MCS table the UE shall use for PUSCH. If the field is absent the UE applies the value 64QAM.

FrequencyHopping indicates frequency hopping scheme to be applied. The value intraSlot enables 'Intra-slot frequency hopping' and the value interSlot enables 'Inter-slot frequency hopping'. If the field is absent, frequency hopping is not configured.

PUSCH-PowerControl is used to configure UE specific power control parameter for PUSCH. It consists of p0-AlphaSets field and p0-NominalWithoutGrant field.

P0-AlphaSets field includes a plurality of P0-PUSCH-AlphaSet IEs. A P0-PUSCH-AlphaSet IE comprises a p0-PUSCH-AlphaSetId field and a p0 field.

P0 field indicates P0 value for PUSCH with grant (except msg3) in steps of 1 dB. When the field is absent the UE applies the value 0.

P0-NominalWithoutGrant field indicates P0 value for UL grant-free PUSCH (configured grant based PUSCH).

PUCCH-ConfigCommon is the cell-specific PUCCH parameter of the BWP. It consists of subfields such as pucch-ResourceCommon and p0-nominal.

PUCCH-ResourceCommon is an index corresponding to a cell-specific PUCCH resource parameters. One index corresponds to a PUCCH format, a PUCCH time period, a PUCCH frequency period, a PUCCH code, and the like.

P0-nominal is a power offset applied during PUCCH transmission. Defined as an integer between −202 and 24 in increments of 2. The unit is dBm.

PUCCH-ConfigCommon is used to configure UE specific PUCCH parameters. It consists of fields such as dl-DataToUL-ACK field and resourceSetToAddModList field and others.

DL-DataToUL-ACK field includes a list of timing for given PDSCH to the DL ACK.

ResourceSetToAddModList includes a list for adding PUCCH resource sets.

TDD-UL-DL-ConfigurationCommon is cell specific TDD UL/DL configuration. It consists of subfields such as referenceSubcarrierSpacing, pattern1, and pattern2.

ReferenceSubcarrierSpacing is the reference SCS used to determine the time domain boundary in the UL-DL pattern.

Pattern1 and pattern2 are TDD Uplink Downlink Pattern. It consists of subfields such as dl-UL-TransmissionPeriodicity, nrofDownlinkSlots, nrofDownlinkSymbols, nrofUplinkSlots, and nrofUplinkSymbols.

DL-UL-TransmissionPeriodicity indicates the period of the DL-UL pattern.

NRofDownlinkSlots indicates the number of consecutive full DL slots in each DL-UL pattern.

NRofDownlinkSymbols indicates the number of consecutive DL symbols from the beginning of the slot following the last full DL slot.

NRofUplinkSlots indicates the number of consecutive full UL slots in each DL-UL pattern.

NRofUplinkSymbols indicates the number of consecutive UL symbols at the last time point of a slot preceding the first full UL slot A terminal and a base station operate as below.

Receiving, by the terminal via downlink channel of a first cell, a system information. The system information comprises a timeAlignmentTimer IE and one or two PUSCH-ConfigCommon IE. Applying the timeAlignmentTimer IE included in the system information to a first time.

Receiving, by the terminal via downlink channel of a first cell, a random access response. The random access response comprises a Timing Advance Command field and a Temporary C-RNTI field. The Timing Advance Command field includes a first TA command. Applying the first TA command received in the RAR and starting the first timer by the terminal.

Setting, by the terminal, the C-RNTI to the value of the temporary C-RNTI received in the RAR if the UE Contention Resolution Identity in the MAC CE matches the CCCH SDU transmitted in Msg 3.

Receiving, by the terminal from the base station, a RRCSetup message. The RRCSetup message comprises a radioBearerConfig field and a masterCellGroup field.

Receiving, by the terminal from the base station, a RRCReconfiguration message. The RRCReconfiguration message comprises a RNTI-Value IE for a first CS-RNTI and a plurality of configuredGrantConfig IEs and a plurality of PUSCH-Config IEs and a plurality of SRS-Config IEs. Each of the plurality of configuredGrantConfig IE is associated with an uplink BWP of a NUL or with an uplink BWP of SUL. Each of the plurality of PUSCH-Config IE is associated with an uplink BWP of a NUL or with an uplink BWP of SUL. Each of the plurality of SRS-Config IE is associated with an uplink BWP of a NUL or with an uplink BWP of SUL. Receiving, by the terminal from the base station, a MAC PDU based at least in part on a downlink assignment for the first C-RNTI. Applying a second TA command received in a TAC MAC CE and restarting the first timer by the terminal if the MAC PDU includes the TAC MAC CE.

Determining, by the terminal, a first subframe and a first symbol based at least in part on a first configuredGrantConfig IE selected from the plurality of configuredGrantConfig IEs. Determining, by the terminal, a second subframe and a second symbol based at least in part on a dynamic grant received for the first CS-RNTI.

Performing, by the terminal in RRC_CONNECTED, initial uplink transmission for the configured grant in the first symbol in the first subframe based at least in part on a first p0-NominalWithoutGrant and a first p0 and a first dataScramblingIdentityPUSCH and a first frequencyHopping.

Performing, by the terminal in RRC_CONNECTED, uplink retransmission in the second symbol in the second subframe based at least in part on a first p0-NominalWithoutGrant and a first p0 and a first dataScramblingIdentityPUSCH and a second frequencyHopping.

The first p0-NominalWithoutGrant is included in the first PUSCH-Config. The first p0 is determined based at least in part on the first ConfiguredGrantConfig and the first PUSCH-Config. The first p0 is determined by p0-PUSCH-Alpha field of the first ConfigurdGrantConfig and the corresponding p0 field in the first PUSCH-Config.

The first dataScramblingIdentityPUSCH is included in the first PUSCH-Config. The first frequencyHopping is included in the first ConfiguredGrantConfig. The second frequencyHopping is included in the first PUSCH-Config.

Receiving, by the terminal, a RRCRelease message to transit the terminal in RRC_CONNECTED to RRC_INACTIVE. The RRCRelease message includes a SuspendConfig IE.

The SuspendConfig IE includes a first IE group and a second IE group1 and a second IE group2 and a third IE group. The first IE group comprises a I-RNTI-Value IE and a short I-RNTI-Value IE and a pagingCycle IE and a RAN-NotificationAreaInfo IE. The second IE group1 comprises a sdt-DRB-List field and a sdt-SRB2-Indication field The second IE group2 comprises a cs-RNTI field and a sdt-MAC-PHY-CG-Config field. The cs-RNTI field includes a RNTI-Value IE for a second CS-RNTI. The sdt-MAC-PHY-CG-Config field includes a TimeAlignmentTimer IE and a BWP-Downlink-Dedicated-SDT IE and one or two BWP-Uplink-Dedicated-SDT IE and a CG-SDT-TA-ValiditationConfig IE. The BWP-Downlink-Dedicated-SDT IE comprises a PDCCH-Config IE and a PDSCH-Config IE. The BWP-Uplink-Dedicated-SDT IE comprises a PUCCH-Config IE and a PUSCH-Config IE and one or more ConfiguredGrantConfig IEs.

The configuredGrantConfig IE is associated with an initial uplink BWP of a NUL or an initial uplink BWP of a SUL. The configuredGrantConfig IE comprises a timeDomainOffset field and timeDomainAllocation field and a frequencyHopping field and a p0-PUSCH-Alpha field. The ConfiguredGrantConfig optionally includes a sdt-P0-PUSCH field. The p0-PUSCH-Alpha field includes an index indicating a first P0 value. sdt-P0-PUSCH field includes a value indicating a second P0 value. If sdt-P0-PUSCH field is included in the configuredGrantConfig IE, the second P0 value is applied.

The PUSCH-Config IE comprises a dataScramblingIdentityPUSCH field and a pusch-PowerControl field and a frequencyHopping field. The pusch-PowerControl field comprises p0-AlphaSets field and p0-NominalWithoutGrant field. p0-AlphaSets field includes a plurality of P0-PUSCH-AlphaSet IEs. A P0-PUSCH-AlphaSet IE comprises a p0-PUSCH-AlphaSetId field and a p0 field.

The third IE group comprises a SRS-Config IE in a srs-Config field and a BWP IE in a bwp field and a TimeAlignmentTimer IE in a srs-TimeAlignmentTimer field and a RNTI-Value IE in c-RNTIforSRSActivation field. The BWP IE indicates frequency domain location and bandwidth and subcarrier spacing for SRS transmission during RRC_INACTIVE state The subframe for a configured grant is determined based at least in part on the timeDomainOffset IE. The symbols for a configured grant is determined based at least in part on timedomainAllocation IE and the HARQ process ID for configured grant is determined based at least in part on nrofHARQ-Processes IE.

Performing the first operation set if the RRCRelease message (or suspendConfig IE) includes the first IE group and does not include the second IE group and does not include the third IE group. The first operation set comprises: applying the received suspendConfig. stopping all timers related with MAC functionalities. releasing PUCCH-CSI-Resources configured in CSI-ReportConfig. releasing SRS-Resource instances configured in SRS-Config. releasing SchedulingRequestResourceConfig instances configured in PUCCH-Config. clearing any configured downlink assignments and configured uplink grants in all BWPs in all serving cells. clearing any PUSCH resource for semi-persistent CSI reporting. storing in the UE Inactive AS Context the C-RNTI used in the source PCell. entering RRC_INACTIVE. performing cell selection.

Performing the second operation set if the RRCRelease message (or suspendConfig IE) includes the first IE group and the second IE group and does not include the third IE group. The second operation set comprises: applying the first IE group of received suspendConFIG. Identifying radio bearers to be configured for SDT based at least in part on the second IE group1. stopping all timers related with MAC functionalities. releasing PUCCH-CSI-Resources configured in CSI-ReportConfig. releasing SRS-Resource instances configured in SRS-Config. releasing SchedulingRequestResourceConfig instances configured in PUCCH-Config. clearing any configured downlink assignments and configured uplink grants in all BWPs in all serving cells except the configured uplink grants configured based on the second IE group2 in the received RRCRelease message. clearing any PUSCH resource for semi-persistent CSI reporting. configuring the configured grant resources based at least in part on the second IE group2. starting cg-SDT-TimeAlignmentTimer if included in the second part of the received SuspendConfig. storing in the UE Inactive AS Context the C-RNTI used in the source PCell. storing in the UE Inactive AS Context the CS-RNTI received in the SuspendConfig (if received) or used in the source PCell (if used and not received). entering RRC_INACTIVE. performing cell selection. Alternatively, applying the second IE group after cell selection if the cell where RRCRelease message is received is selected Performing the third operation set if the RRCRelease message (or suspendConfig IE) includes the first IE group and the third IE group and does not include the second IE group. The third operation set comprises: applying the first IE group of received suspendConfig. stopping all timers related with MAC functionalities. releasing PUCCH-CSI-Resources configured in CSI-ReportConfig. releasing SRS-Resource instances configured in SRS-Config except the SRS-Resource configured based on the third IE group in the received RRCRelease. releasing SchedulingRequestResourceConfig instances configured in PUCCH-Config. clearing any configured downlink assignments and configured uplink grants in all BWPs of all serving cells. clearing any PUSCH resource for semi-persistent CSI reporting. Configuring SRS resource based at least in part on the third IE group. starting srs-TimeAlignmentTimer. storing in the UE Inactive AS Context the C-RNTI received in the SuspendConfig (if received) and the C-RNTI used in the source PCell (if not received). entering RRC_INACTIVE. performing cell selection. Alternatively, applying the third IE group after cell selection if the cell where RRCRelease message is received is selected.

Performing the fourth operation set if the RRCRelease message (or suspendConfig IE) includes the first IE group and the second IE group and the third IE group. The fourth operation set comprises: applying the first IE group of received suspendConFIG. Identifying radio bearers to be configured for SDT based at least in part on the second IE group1. stopping all timers related with MAC functionalities. releasing PUCCH-CSI-Resources configured in CSI-ReportConfig. releasing SRS-Resource instances configured in SRS-Config except the SRS-Resource configured based on the third IE group in the received RRCRelease. releasing SchedulingRequestResourceConfig instances configured in PUCCH-Config. clearing any configured downlink assignments and configured uplink grants in all BWPs in all serving cells except the configured uplink grants configured based on the second IE group2 in the received RRCRelease message. clearing any PUSCH resource for semi-persistent CSI reporting. applying the second IE group of received suspendConfig. applying the third IE group of received suspendConfig. configuring SRS resource based at least in part on the third IE group. starting srs-TimeAlignmentTimer. configuring the configured grant resources based at least in part on the second IE group2. starting cg-SDT-TimeAlignmentTimer if included in the second part of the received SuspendConfig. storing in the UE Inactive AS Context the C-RNTI received in the SuspendConfig (if received) and the C-RNTI used in the source PCell. storing in the UE Inactive AS Context the CS-RNTI received in the SuspendConfig (if received) or used in the source PCell (if used and not received). entering RRC_INACTIVE. performing cell selection. alternatively, applying the second IE group and the third IE group after cell selection if the cell where RRCRelease message is received is selected.

Selecting, by the terminal, a second cell based at least in part on RSRP and RSRQ. Receiving, by the terminal from a downlink channel of the second cell, MIB and SIB1. Determining, by the terminal, if the second cell is different from the first cell based at least in part on the received SIB1. Considering cg-SDT-TimeAlignmentTimer is expired and clearing the configured grant resources by the terminal if the second cell is different from the first cell. Considering srs-TimeAlignmentTimer is expired and releasing the SRS resource by the terminal if the second cell is different from the first cell.

Determining, by the terminal, a third subframe and a third symbol for initial uplink transmission based at least in part on the configuredGrantConfig IE included in the second IE group2. Determining, by the terminal, a fourth subframe and a fourth symbol for uplink retransmission based at least in part on a dynamic grant received for the second CS-RNTI in RRC_INACTIVE. The second CS-RNTI is included in the extended part of the suspendConfig of the RRCRelease message.

Initiating, by the terminal, SDT procedure when specific conditions are met. Selecting, by the terminal based at least in part on a rsrp-ThresholdSSB-SUL in a RACH-Config-Common, an uplink between SUL and NUL. Validating, by the terminal, TA of the initial CG-SDT transmission based at least in part on the cg-SDT-Config-Initial-BWP-SUL if SUL is selected. Validating, by the terminal, TA of the initial CG-SDT transmission based at least in part on the cg-SDT-Config-Initial-BWP-NUL if NUL is selected. The RACH-ConfigCommon is included in a SIB1. The SIM is received in the second cell. cg-SDT-Config-Initial-BWP-SUL and cg-SDT-Config-Initial-BWP-NUL are included in a SuspendConfig in a RRCRelease message. The RRCRelease message is received in the first cell.

RRC_INACTIVE UE monitors PDCCH based at least in part on a first search space indicated in a PDCCH-Config-Common during a first time period. RRC_INACTIVE UE monitors PDCCH based at least in part on a second search space indicated in a PDCCH-ConfigCommon during a second time period. RRC_INACTIVE UE monitors PDCCH based at least in part on a third search space indicated in a PDCCH-Config during a third time period. The first time period is the time period during when neither RA-SDT nor CG-SDT is ongoing. Specifically, the first time period is from the time point when UE enters RRC_INACTIVE to the time point when SDT is initiated. The second time period is the time period during when RA-SDT is ongoing. Specifically, the second time period is from the time point when UE initiates SDT and transmits RACH preamble to the time point when RA-SDT is completed. The third time period is the time period during when CG-SDT is ongoing. Specifically, the third time period is from the time point when UE initiates SDT and transmits the first initial transmission on the configured grant to the time point when CG-SDT is completed. The PDCCH-ConfigCommon is included in a SIB1. The SIM is received in the second cell. The PDCCH-Config is included in a SuspendConfig in a RRCRelease message. The RRCRelease message is received in the first cell. The first search space is indicated by a PagingSearchSpace in the PDCCH-ConfigCommon. The second search space is indicated by a ra-searchSpace in the PDCCH-ConfigCommon. The third search space is indicated in the PDCCH-Config-Common. The first search space and the second search space are common search space. The third search space is UE-specific search space.

RRC_INACTIVE UE monitors PDCCH based at least in part on a first control resource set indicated in a PDCCH-ConfigCommon during the first time period. RRC_INACTIVE UE monitors PDCCH based at least in part on a first control resource set indicated in a PDCCH-ConfigCommon during the second time period. RRC_INACTIVE UE monitors PDCCH based at least in part on a second control resource set indicated in a PDCCH-Config during the third time period.

The first control resource set is CORESET #0. The second control resource set is indicated in the PDCCH-Config. A plurality of PDCCH-Config can be included in a RRCReconfiguration. A PDCCH-Config can be included in a RRCRelease.

RRC_INACTIVE UE monitors PDCCH based at least in part on a P-RNTI during the first time period. RRC_INACTIVE UE monitors PDCCH based at least in part on the second C-RNTI during a second time period. RRC_INACTIVE UE monitors PDCCH based at least in part on a second CS-RNTI during the third time period. The second C-RNTI is indicated in the RRCRelease. The second CS-RNTI is indicated in the RRCRelease.

Performing, by the terminal in RRC_INACTIVE, initial uplink transmission for the configured grant in the third symbol in the third subframe based at least in part on a third p0-NominalWithoutGrant and a third p0 and a third dataScramblingIdentityPUSCH and a third frequencyHopping. Performing, by the terminal in RRC_INACTIVE, uplink retransmission for the configured grant in the fourth symbol in the fourth subframe based at least in part on a third p0-NominalWithoutGrant and a third p0 and a third dataScramblingIdentityPUSCH and a fourth frequencyHopping. The third p0-NominalWithoutGrant is included in the second PUSCH-Config. The third p0 is determined based at least in part on a value indicated in the p0-PUSCH-Alpha field and presence of the sdt-P0-PUSCH field in the second IE group and a value indicated in the sdt-P0-PUSCH field and the corresponding p0 in the second PUSCH-Config. The third dataScramblingIdentityPUSCH is included in the second PUSCH-Config. The third frequencyHopping is included in the second ConfiguredGrantConfig IE in the second IE group2. The fourth frequencyHopping is included in the second PUSCH-Config.

Receiving, by the terminal from the base station, a MAC PDU based at least in part on a downlink assignment for the first C-RNTI. The MAC PDU includes a SP Positioning SRS Activation/Deactivation MAC CE and a RRCRelease message. Activating, by the terminal, a Positioning SRS Resource Set at a second SRS activation time based at least in part on SRS activation information group2 of the received SP Positioning SRS Activation/Deactivation MAC CE if A/D field is set to 1.

The second SRS activation time is slot n+k+m. HARQ ACK corresponding to the PDSCH carrying the activation command is transmitted in slot n. k is number of the second slots corresponding to 60 ms. or k is number of slots determined based at least in part on the time point when SRS-Config included in the RRCRelease message is applied (or received). The second slot is the slot of the UL BWP configured by the BWP field in the third IE group. The length of the second slot is determine based at least in part on subcarrierSpacing IE included in the third IE group. The SRS activation information group2 comprises SUL field and Positioning SRS Resource Set ID. SRS resource is activated in the cell where RRCRelease message is received and in the UL BWP configured by RRCRelease message.

Receiving, by the terminal from the base station, a MAC PDU based at least in part on a downlink assignment for the second C-RNTI. The MAC PDU includes a SP Positioning SRS Activation/Deactivation MAC CE. Activating, by the terminal, a Positioning SRS Resource Set at a third SRS activation time based at least in part on SRS activation information group2 of the received SP Positioning SRS Activation/Deactivation MAC CE if A/D field is set to 1 and if the third timer is running at the third SRS activation time. Deactivating, by the terminal, a Positioning SRS Resource Set at a third SRS activation time based at least in part on SRS activation information group1 of the received SP Positioning SRS Activation/Deactivation MAC CE if A/D field is set to 0. The third SRS activation time is slot n+h. HARQ ACK corresponding to the PDSCH carrying the activation command is transmitted in slot n. h is the number of the second slots corresponding to 3 ms. The second slot is the slot of the UL BWP configured by the third IE group. The length of the second slot is determine based at least in part on subcarrierSpacing IE included in the third IE group. The SRS activation information group2 comprises SUL field and Positioning SRS Resource Set ID. SRS resource is activated in the cell where RRCRelease message is received and in the uplink indicated by SUL field and in the UL BWP configured by RRCRelease message.

Receiving, by the terminal from the base station, a MAC PDU based at least in part on a downlink assignment. The MAC PDU includes a SP Positioning SRS Activation/ Deactivation MAC CE and a RRCRelease message. Activating, by the terminal, a Positioning SRS Resource Set at a third SRS activation time based at least in part on SRS activation information group2 of the received SP Positioning SRS Activation/Deactivation MAC CE if t A/D field is set to 1 and if the third timer is running at the third SRS activation time and if the MAC PDU is received for the second C-RNTI. Activating, by the terminal, a Positioning SRS Resource Set at a second SRS activation time based at least in part on SRS activation information group2 of the received SP Positioning SRS Activation/Deactivation MAC CE if t A/D field is set to 1 and if the MAC PDU is received for the first C-RNTI.

Receiving, by the terminal from the base station, a MAC PDU based at least in part on a downlink assignment for the first C-RNTI. Activating, by the terminal, a Positioning SRS Resource Set at a first SRS activation time based at least in part on SRS activation information group1 of the received SP Positioning SRS Activation/Deactivation MAC CE if the SP Positioning SRS Activation/Deactivation MAC CE is included in the MAC PDU and if A/D field is set to 1. Deactivating, by the terminal, a Positioning SRS Resource Set at a first SRS activation time based at least in part on SRS activation information group1 of the received SP Positioning SRS Activation/Deactivation MAC CE if the SP Positioning SRS Activation/Deactivation MAC CE is included in the MAC PDU and if A/D field is set to 0. The first SRS activation time is slot n+m. HARQ ACK corresponding to the PDSCH carrying the activation command is transmitted in slot n. m is number of the first slots corresponding to 3 ms. The first slot is the slot of the currently active UL BWP. The SRS activation information group1 comprises Positioning SRS Resource Set's cell ID field and Positioning SRS Resource Set's BWP ID and SUL field and Positioning SRS Resource Set ID. SRS resource is activated in the cell indicated by Positioning SRS Resource Set's cell ID field and in the uplink indicated by SUL field and in the BWP indicated by Positioning SRS Resource Set's BWP ID.

Validating, by the terminal, TA of the initial CG-SDT transmission based at least in part on the first downlink pathloss reference RSRP value and cg-SDT-RSRP-Change-Threshold and the second downlink pathloss reference RSRP value if the second cell is the first cell. The first downlink pathloss reference RSRP value is the downlink pathloss reference RSRP value of the first cell when the second timer is configured (or started, or RRCRelease message including cg-SDT-TimeAlignmentTimer is received, or RRCRelease message including the second ConfiguredGrantConfig IE is received). The second downlink pathloss reference RSRP value is the downlink pathloss reference RSRP value of the second cell.

ConfiguredGrantConfig IE includes a periodicity field and a timeDomainOffset field and a timeDomainAllocation field and a frequencyHopping field and a p0-PUSCH-Alpha. The first ConfiguredGrantConfig IE is selected from a plurality of ConfiguredGrantConfig IEs included in the RRCReconfiguration message. The first ConfiguredGrantConfig IE is associated with the active uplink BWP. The first ConfiguredGrantConfig is used in RRC_CONNECTED. The first ConfiguredGrantConfig IE includes a periodicity field and a timeDomainOffset field and a timeDomainAllocation field and a frequencyHopping field and a p0-PUSCH-Alpha field. The second ConfiguredGrantConfig IE is included in the extended part of the SuspendConfig in the RRCRelease message. The second ConfiguredGrantConfig IE is associated with the initial uplink BWP. The second ConfiguredGrantConfig is used in RRC_INACTIVE. The second ConfiguredGrantConfig IE includes a periodicity field and a timeDomainOffset field and a timeDomainAllocation field and a frequencyHopping field and a p0-PUSCH-Alpha field and sdt-P0-PUSCH field.

The first subframe is determined based at least in part on a value indicated in timeDomainOffset field in the first ConfiguredGrantConfig. The first symbol is determined based at least in part on a value indicated in timeDomainAllocation field in the first ConfiguredGrantConfig. The third subframe is determined based at least in part on a value indicated in timeDomainOffset field in the second ConfiguredGrantConfig. The third symbol is determined based at least in part on a value indicated in timeDomainAllocation field in the second ConfiguredGrantConfig.

The second subframe is determined based at least in part on a dynamic grant received for the first CS-RNTI. The second symbol is determined based at least in part on a dynamic grant received for the first CS-RNTI. The fourth subframe is determined based at least in part on a dynamic grant received for the second CS-RNTI (if the second CS-RNTI is available) or for the third CS-RNTI (if the second CS-RNTI is not available). The fourth symbol is determined based at least in part on a dynamic grant received for the second CS-RNTI (if the second CS-RNTI is available) or for the third CS-RNTI (if the second CS-RNTI is not available).

The p0-PUSCH-Alpha field includes an index indicating a P0 value. The first PUSCH-Config IE is selected from a plurality of PUSCH-Config IEs included in the RRCReconfiguration message. The first PUSCH-Config IE is associated with the active uplink BWP. The first PUSCH-Config IE is used in RRC_CONNECTED. The first PUSCH-Config IE includes a dataScramblingIdentityPUSCH field and frequencyHopping field and p0-AlphaSets field and p0-NominalWithoutGrant field. The second PUSCH-Config IE is included in the RRCRelease message. The second PUSCH-Config IE is associated with the initial uplink BWP. The second PUSCH-Config IE is used in RRC_INACTIVE. The second PUSCH-Config IE includes a dataScramblingIdentityPUSCH field and frequencyHopping field and p0-Alpha-Sets field and p0-NominalWithoutGrant field. p0-AlphaSets field includes a plurality of p0-PUSCH-AlphaSetId fields and a plurality of p0 fields. p0 field includes p0 value for PUSCH in steps of 1 dB. Each p0-PUSCH-AlphaSetId is associated with a p0.

The RNTI-Value IE includes an integer representing a Radio Network Temporary Identity. The first CS-RNTI is included in a RRCReconfiguration message. The first CS-RNTI is used in RRC_CONNECTED state. A single first CS-RNTI for MCG is included in a RRCReconfiguration message. The first CS-RNTI is used in RRC_CONNECTED state. The first C-RNTI is determined by the temporary C-RNTI received in the RAR at the point of time when UE Contention Resolution Identity MAC CE is received. The first C-RNTI is used in RRC_CONNECTED state. The second CS-RNTI is included in the extended part of SuspendConfig IE in RRCRelease message. A single second CS-RNTI is included in a RRCRelease message. The second CS-RNTI is used in RRC_INACTIVE state. The second C-RNTI is included in the extended part of SuspendConfig IE in RRCRelease message. A single second CS-RNTI is included in a RRCRelease message. The second C-RNTI is used in RRC_INACTIVE state. The third CS-RNTI is the CS-RNTI used in the source PCell and stored in the UE Inactive AS Context. The third CS-RNTI is used in RRC_INACTIVE state. The third C-RNTI is the C-RNTI used in the source PCell and stored in the UE Inactive AS Context. The third C-RNTI is used in RRC_INACTIVE state. The first IE group includes a fullI-RNTI field and a shortI-RNTI field and a ran-PagingCycle field and a ran-NotificationAreaInfo field.

The second IE group1 includes a sdt-DRB-List field and a sdt-SRB2-Indication field. The second IE group2 includes a cg-SDT-TimeAlignmentTimer field and a cg-SDT-TA-ValiditationConfig field and a cg-SDT-Config-Initial-BWP-NUL field and a cg-SDT-Config-Initial-BWP-SUL field and a cg-SDT-Config-Initial-BWP-DL field and a CS-RNTI field. The cg-SDT-TimeAlignmentTimer field includes a TimeAlignmentTimer IE for the second timer. The cg-SDT-TA-ValiditationConfig field includes a cg-SDT-TA-ValidityThresholdSSB field. The cg-SDT-TA-ValidityThresholdSSB field indicates an RSRP threshold for CG-SDT resource validation. The cg-SDT-Config-Initial-BWP-NUL field includes includes a PUCCH-Config IE and a PUSCH-Config IE and a ConfiguredGrantConfig IE. The cg-SDT-Config-Initial-BWP-NUL is for the initial uplink BWP of normal uplink. The cg-SDT-Config-Initial-BWP-NUL is used in RRC_INACTIVE if NUL is selected. The cg-SDT-Config-Initial-BWP-SUL field includes a PUCCH-Config IE and a PUSCH-Config IE and a ConfiguredGrantConfig IE. The cg-SDT-Config-Initial-BWP-SUL is for the initial uplink BWP of the supplementary uplink. The cg-SDT-Config-Initial-BWP-SUL is used in RRC_INACTIVE if SUL is selected. The cg-SDT-Config-Initial-BWP-DL field includes a PDCCH-Config IE and a PDSCH-Config IE. The cg-SDT-Config-Initial-BWP-DL is for the initial downlink BWP and used in RRC_INACTIVE. The CS-RNTI field includes a RNTI-Value IE for the second CS-RNTI.

The third IE group is included in a third part of the SuspendConfig IE. The third part is extended part of SuspendConfig. The third IE group includes a srs-Config field and a bwp field and a srs-TimeAlignmnetTimer field and a srs-PosRRC-ValiditationConfig field and a C-RNTI field. The SuspendConfig IE includes a first IE group and a second IE group1 and a second IE group2 and a third IE group.

The first IE group is included in a first part of the SuspendConfig IE. The first part is non-extended part of SuspendConfig. The second IE group1 is included in a second part of the SuspendConfig IE. The second part is a first extended part of SuspendConfig. The second IE group2 is included in a second part of the SuspendConfig IE. The second part is a second extended part of SuspendConfig. The first extended part locates before the second extended part.

The timAlignmentTimer IE indicates a numerical value among a plurality of numerical values or a non-numerical value indicating infinity. The first TA command is included in RAR. The first TA command indicates an absolute amount. The first TA command is received based at least in part on a RA-RNTI. The second TA command is included in TAC MAC CE. The second TA command indicates an relative amount. The second TA command is received based at least in part on a second C-RNTI (if the second C-RNTI is received in the extended part of suspendConfig IE in RRCRelease message) or based at least in part on a second CS-RNTI (if the second C-RNTI is not received in the extended part of suspendConfig IE in RRCRelease message and if the second CS-RNTI is received in the extended part of suspendConfig IE in RRCRelease message) or based at least in part on a third C-RNTI (if neither second C-RNIT nor second CS-RNTI are received in the extended part of suspendConfig IE in RRCRelease message) in RRC_INACTIVE and based at least in part on a first C-RNTI in RRC_CONNECTED.

Applying, by the terminal, value indicated in the timeAlignmentTimer IE in the system information block 1 to the first timer. Applying the first TA command received in the RAR and starting the first timer by the terminal. Receiving, by the terminal from the base station, a MAC PDU based at least in part on a downlink assignment for the first C-RNTI. Applying a second TA command received in a TAC MAC CE and restarting the first timer by the terminal if the MAC PDU includes the TAC MAC CE.

Releasing a first resource by the terminal when the first timer expires. The first resource comprises a PUCCH-CSI-Resources configured in CSI-ReportConfig and a SRS-Resource instances (each SRS resource configured by SRS-Config) configured in SRS-Config and a SchedulingRequestResourceConfig instances configured in PUCCH-Config and any configured downlink assignments and any configured uplink grants and any PUSCH resource for semi-persistent CSI reporting. The first resource is configured by RRCReconfiguration message and used in RRC_CONNECTED. The first resource is configured in a first uplink BWP. The first uplink BWP is the active BWP.

Applying value indicated in the timeAlignmentTimer IE in the cg-sdt-TimeAlignmentTimer field in the received RRCRelease to the second timer and starting the second timer by the terminal. Receiving, by the terminal from the base station, a MAC PDU based at least in part on a downlink assignment for the second CS-RNTI. Applying a second TA command received in a TAC MAC CE and restarting the second timer by the terminal if the MAC PDU includes the TAC MAC CE. Releasing a second resource when the second timer expires. The second resource comprises configured grants configured by the second IE group2. The second resource is configured by RRCRelease and used in RRC_INACTIVE. The second resource is configured in the second uplink BWP. The second uplink BWP is the initial uplink BWP. Applying value indicated in the time-AlignmentTimer IE in the srs-TimeAlignmentTimer field in the received RRCRelease to the third timer and starting the third timer by the terminal Receiving, by the terminal from the base station, a MAC PDU based at least in part on a downlink assignment for the second C-RNTI. Applying a second TA command received in a TAC MAC CE and restarting the third timer by the terminal if the MAC PDU includes the TAC MAC CE. Releasing by the terminal a third resource when the third timer expires. The third resource comprises a SRS-Resource instances configured in SRS-Config in the third IE group. the third resource is configured by RRCRelease and used in RRC_INACTIVE. The third resource is configured in the third uplink BWP. The third uplink BWP is configured by BWP IE included in third IE group in the RRCRelease message.

Receiving, by the terminal from the base station, a MAC PDU based at least in part on a downlink assignment. Applying a second TA command received in a TAC MAC CE and restarting a plurality of timers by the terminal if the MAC PDU includes the TAC MAC CE and if the downlink assignment is for the second C-RNTI and if the UE is in RRC_INACTIVE. The plurality of timers includes a first timer, if running, and a second timer, if running, and a third timer if running. Applying a second TA command received in a TAC MAC CE and restarting a first timer if the MAC PDU includes the TAC MAC CE and if the downlink assignment is for the first C-RNTI and if the UE is RRC_CONNECTED.

Performing, by the terminal in RRC_CONNECTED, initial uplink transmission for the configured grant in the first symbol in the first subframe. Performing, by the terminal in RRC_CONNECTED, initial uplink transmission for the configured grant in the first symbol in the first subframe. Performing, by the terminal in RRC_CONNECTED, uplink retransmission in the second symbol in the second subframe. Performing, by the terminal in RRC_CONNECTED, initial uplink transmission for the configured grant in the first symbol in the first subframe based at least in part on a first p0. Performing, by the terminal in RRC_CONNECTED, uplink retransmission in the second symbol in the second subframe based at least in part on a first p0. The first p0 is determined based at least in part on the first ConfiguredGrantConfig and the first PUSCH-Config. The first p0 is determined by p0-PUSCH-Alpha field of the first ConfigurdGrantConfig and the corresponding p0 field in the first PUSCH-Config. Performing, by the terminal in RRC_CONNECTED, SRS transmission based at least in part on the Positioning SRS Resource Set in the fourth UL BWP of the fourth cell if the Positioning SRS is activated and if the fourth UL BWP is active and if the first timer associated with the fourth cell is running. The fourth UL BWP is the BWP indicated in the BWP ID field of SP Positioning SRS Activation/Deactivation MAC CE. The common configuration of the fourth UL BWP is provided in a RRCReconfiguration message and the dedicated configuration of the fourth UL BWP is provided in the RRCReconfiguration.

PUCCH-ConfigCommon and PUSCH-ConfigCommon of the fourth UL BWP is provided in a first DL message and PUCCH-Config and PUSCH-Config of the fourth UL BWP is provided in the RRCReconfiguration or in the RRCSetup. The fourth cell is the cell indicated in the Cell ID field of SP Positioning SRS Activation/Deactivation MAC CE.

Performing, by the terminal in RRC_INACTIVE, SRS transmission based at least in part on the Positioning SRS Resource Set in the third UL BWP of the first cell if the Positioning SRS is activated and if the third timer is running.

Performing, by the terminal in RRC_INACTIVE, SRS transmission based at least in part on the Positioning SRS Resource Set in the third UL BWP of the first cell if the resource type of the positioning SRS is periodic and if the third timer is running.

The third UL BWP is the initial UL BWP. The common configuration of the third UL BWP is provided in a RRCReconfiguration message and the dedicated configuration of the third UL BWP is provided in RRCRelease. PUCCH-ConfigCommon and PUSCH-ConfigCommon of the third UL BWP is provided in a first DL message and PUCCH-Config and PUSCH-Config of the third UL BWP is provided in a second DL message. The first DL message is either SIB1 or RRC Setup or RRCReconfiguration. The second DL message is RRCRelease.

The first cell is the cell where the first RRCRelease message is received. The first RRCRelease message includes the second IE group2 or the third IE group Transmitting, by the base station via downlink channel of a first cell, a system information. The system information comprises a timeAlignmentTimer IE and one or two PUSCH-ConfigCommon IE.

Transmitting, by the base station via downlink channel of a first cell, a random access response. The random access response comprises a Timing Advance Command field and a Temporary C-RNTI field. The Timing Advance Command field includes a first TA command.

Transmitting, by the base station to the terminal, a RRCSetup message. The RRCSetup message comprises a radioBearerConfig field and a masterCellGroup field.

Transmitting, by the base station to the terminal, a RRCReconfiguration message. The RRCReconfiguration message comprises a RNTI-Value IE for a first CS-RNTI and a plurality of configuredGrantConfig IEs and a plurality of PUSCH-Config IEs and a plurality of SRS-Config IEs. Each of the plurality of configuredGrantConfig IE is associated with an uplink BWP of a NUL or with an uplink BWP of SUL. Each of the plurality of PUSCH-Config IE is associated with an uplink BWP of a NUL or with an uplink BWP of SUL. Each of the plurality of SRS-Config IE is associated with an uplink BWP of a NUL or with an uplink BWP of SUL.

Transmitting, by the base station to the terminal, a MAC PDU based at least in part on a downlink assignment for the first C-RNTI.

Determining, by the base station, a first subframe and a first symbol based at least in part on a first configuredGrantConfig IE selected from the plurality of configuredGrantConfig IEs. Determining, by the base station, a second subframe and a second symbol based at least in part on a dynamic grant received for the first CS-RNTI.

Performing, by the base station for the UE in RRC_CONNECTED, initial uplink reception for the configured grant in the first symbol in the first subframe based at least in part on a first p0-NominalWithoutGrant and a first p0 and a first dataScramblingIdentityPUSCH and a first frequencyHopping. Performing, by the base station for the UE in RRC_CONNECTED, uplink rereception in the second symbol in the second subframe based at least in part on a first p0-NominalWithoutGrant and a first p0 and a first dataScramblingIdentityPUSCH and a second frequencyHopping. The first p0-NominalWithoutGrant is included in the first PUSCH-Config. The first p0 is determined based at least in part on the first ConfiguredGrantConfig and the first PUSCH-Config. The first p0 is determined by p0-PUSCH- Alpha field of the first ConfigurdGrantConfig and the corresponding p0 field in the first PUSCH-Config. The first dataScramblingIdentityPUSCH is included in the first PUSCH-Config The first frequencyHopping is included in the first ConfiguredGrantConfig. The second frequencyHopping is included in the first PUSCH-Config. Transmitting, by the base station, a RRCRelease message to transit the terminal in RRC_CONNECTED to RRC_INACTIVE. The RRCRelease message includes a SuspendConfig IE. The SuspendConfig IE includes a first IE group and a second IE group1 and a second IE group2 and a third IE group.

Performing by the base station the first operation set if the RRCRelease message (or suspendConfig IE) includes the first IE group and does not include the second IE group and does not include the third IE group. The first operation set comprises: Stopping all timers related with MAC functionalities. Releasing PUCCH-CSI-Resources configured in CSI-ReportConfig. Releasing SRS-Resource instances configured in SRS-Config. Releasing SchedulingRequestResourceConfig instances configured in PUCCH-Config. Clearing any configured downlink assignments and configured uplink grants in all BWPs in all serving cells. Clearing any PUSCH resource for semi-persistent CSI reporting. Storing in the UE Inactive AS Context the C-RNTI used in the source PCell.

Performing by the base station the second operation set if the RRCRelease message (or suspendConfig IE) includes the first IE group and the second IE group and does not include the third IE group. The second operation set comprises: Stopping all timers related with MAC functionalities. Releasing PUCCH-CSI-Resources configured in CSI-ReportConfig. Releasing SRS-Resource instances configured in SRS-Config. Releasing SchedulingRequestResourceConfig instances configured in PUCCH-Config. Clearing any configured downlink assignments and configured uplink grants in all BWPs in all serving cells except the configured uplink grants configured based on the second IE group2 in the received RRCRelease message. Clearing any PUSCH resource for semi-persistent CSI reporting. Configuring the configured grant resources based at least in part on the second IE group2. Starting cg-SDT-TimeAlignmentTimer if included in the second part of the received SuspendConfig. Storing in the UE Inactive AS Context the C-RNTI used in the source PCell. Storing in the UE Inactive AS Context the CS-RNTI received in the SuspendConfig (if received) or used in the source PCell (if used and not received).

Performing by the base station the third operation set if the RRCRelease message (or suspendConfig IE) includes the first IE group and the third IE group and does not include the second IE group. The third operation set comprises: Applying the first IE group of received suspendConfig. Stopping all timers related with MAC functionalities. Releasing PUCCH-CSI-Resources configured in CSI-ReportConfig. Releasing SRS-Resource instances configured in SRS-Config except the SRS-Resource configured based on the third IE group in the received RRCRelease. Releasing SchedulingRequestResourceConfig instances configured in PUCCH-Config. Clearing any configured downlink assignments and configured uplink grants in all BWPs of all serving cells. Clearing any PUSCH resource for semi-persistent CSI reporting. Configuring SRS resource based at least in part on the third IE group. Starting srs-TimeAlignmentTimer. Storing in the UE Inactive AS Context the C-RNTI received in the SuspendConfig (if received) and the C-RNTI used in the source PCell (if not received). Entering RRC_INACTIVE. Performing cell selection.

Performing by the base station the fourth operation set if the RRCRelease message (or suspendConfig IE) includes the first IE group and the second IE group and the third IE group.

The fourth operation set comprises: stopping all timers related with MAC functionalities. releasing PUCCH-CSI-Resources configured in CSI-ReportConfig. releasing SRS-Resource instances configured in SRS-Config except the SRS-Resource configured based on the third IE group in the received RRCRelease. releasing SchedulingRequestResourceConfig instances configured in PUCCH-Config. clearing any configured downlink assignments and configured uplink grants in all BWPs in all serving cells except the configured uplink grants configured based on the second IE group2 in the received RRCRelease message. clearing any PUSCH resource for semi-persistent CSI reporting. applying the second IE group of received suspendConfig. applying the third IE group of received suspendConfig. configuring SRS resource based at least in part on the third IE group. starting srs-TimeAlignmentTimer. configuring the configured grant resources based at least in part on the second IE group2. starting cg-SDT-TimeAlignmentTimer if included in the second part of the received SuspendConfig. storing in the UE Inactive AS Context the C-RNTI received in the SuspendConfig (if received) and the C-RNTI used in the source PCell. storing in the UE Inactive AS Context the CS-RNTI received in the SuspendConfig (if received) or used in the source PCell (if used and not received).

Transmitting, by the base station via a downlink channel of the second cell, MIB and SIB1.

Determining, by the base station, a third subframe and a third symbol for initial uplink rereception based at least in part on the configuredGrantConfig IE included in the second IE group2. determining, by the base station, a fourth subframe and a fourth symbol for uplink rereception based at least in part on a dynamic grant received for the second CS-RNTI in RRC_INACTIVE. The second CS-RNTI is included in the extended part of the suspendConfig of the RRCRelease message.

Performing, by the base station for the UE in RRC_INACTIVE, initial uplink reception for the configured grant in the third symbol in the third subframe based at least in part on a third p0-NominalWithoutGrant and a third p0 and a third dataScramblingIdentityPUSCH and a third frequencyHopping. Performing, by the base station for the UE in RRC_INACTIVE, uplink rereception for the configured grant in the fourth symbol in the fourth subframe based at least in part on a third p0-NominalWithoutGrant and a third p0 and a third dataScramblingIdentityPUSCH and a fourth frequencyHopping. The third p0-NominalWithoutGrant is included in the second PUSCH-Config. The third p0 is determined based at least in part on a value indicated in the p0-PUSCH-Alpha field and presence of the sdt-P0-PUSCH field in the second IE group and a value indicated in the sdt-P0-PUSCH field and the corresponding p0 in the second PUSCH-Config. The third dataScramblingIdentityPUSCH is included in the second PUSCH-Config. The third frequencyHopping is included in the second ConfiguredGrantConfig IE in the second IE group2. The fourth frequencyHopping is included in the second PUSCH-Config.

Transmitting, by the base station to the terminal, a MAC PDU based at least in part on a downlink assignment for the first C-RNTI. The MAC PDU includes a SP Positioning SRS Activation/Deactivation MAC CE and a RRCRelease message. Activating, by the base station, a Positioning SRS Resource Set at a second SRS activation time based at least in part on SRS activation information group2 of the received SP Positioning SRS Activation/Deactivation MAC CE if t A/D field is set to 1. The second SRS activation time is slot n+k+m. HARQ ACK corresponding to the PDSCH carrying the activation command is received in slot n. k is number of the second slots corresponding to 60 ms. or k is number of slots determined based at least in part on the time point when SRS-Config included in the RRCRelease message is applied (or transmitted). The second slot is the slot of the UL BWP configured by the BWP field in the third IE group. The length of the second slot is determine based at least in part on subcarrierSpacing IE included in the third IE group. The SRS activation information group2 comprises SUL field and Positioning SRS Resource Set ID. SRS resource is activated in the cell where RRCRelease message is received and in the UL BWP configured by RRCRelease message.

Transmitting, by the base station to the terminal, a MAC PDU based at least in part on a downlink assignment for the second C-RNTI. The MAC PDU includes a SP Positioning SRS Activation/Deactivation MAC CE and a RRCRelease message. Activating, by the base station, a Positioning SRS Resource Set at a third SRS activation time based at least in part on SRS activation information group2 of the received SP Positioning SRS Activation/Deactivation MAC CE if t A/D field is set to 1 and if the third timer is running at the third SRS activation time. Deactivating, by the base station, a Positioning SRS Resource Set at a third SRS activation time based at least in part on SRS activation information group1 of the received SP Positioning SRS Activation/Deactivation MAC CE if the SP Positioning SRS Activation/Deactivation MAC CE is included in the MAC PDU and if A/D field is set to 0. The third SRS activation time is slot n+h. HARQ ACK corresponding to the PDSCH carrying the activation command is received in slot n. h is the number of the second slots corresponding to 3 ms. The second slot is the slot of the UL BWP configured by the third IE group. The length of the second slot is determine based at least in part on subcarrierSpacing IE included in the third IE group. The SRS activation information group2 comprises SUL field and Positioning SRS Resource Set ID. SRS resource is activated in the cell where RRCRelease message is received and in the UL BWP configured by RRCRelease message Transmitting, by the base station to the terminal, a MAC PDU based at least in part on a downlink assignment. The MAC PDU includes a SP Positioning SRS Activation/ Deactivation MAC CE and a RRCRelease message. Activating, by the base station, a Positioning SRS Resource Set at a third SRS activation time based at least in part on SRS activation information group2 of the received SP Positioning SRS Activation/Deactivation MAC CE if t A/D field is set to 1 and if the third timer is running at the third SRS activation time and if the MAC PDU is received for the second C-RNTI. Activating, by the base station, a Positioning SRS Resource Set at a second SRS activation time based at least in part on SRS activation information group2 of the received SP Positioning SRS Activation/Deactivation MAC CE if t A/D field is set to 1 and if the MAC PDU is received for the first C-RNTI.

Transmitting, by the base station to the terminal, a MAC PDU based at least in part on a downlink assignment for the first C-RNTI. Activating, by the base station, a Positioning SRS Resource Set at a first SRS activation time based at least in part on SRS activation information group1 of the received SP Positioning SRS Activation/Deactivation MAC CE if the SP Positioning SRS Activation/Deactivation MAC CE is included in the MAC PDU and if A/D field is set to 1. Deactivating, by the base station, a Positioning SRS Resource Set at a first SRS activation time based at least in part on SRS activation information group1 of the received SP Positioning SRS Activation/Deactivation MAC CE if the SP Positioning SRS Activation/Deactivation MAC CE is included in the MAC PDU and if A/D field is set to 0. The first SRS activation time is slot n+m. HARQ ACK corresponding to the PDSCH carrying the activation command is received in slot n. m is number of the first slots corresponding to 3 ms. The first slot is the slot of the currently active UL BWP. The SRS activation information group1 comprises Positioning SRS Resource Set's cell ID field and Positioning SRS Resource Set's BWP ID and SUL field and Positioning SRS Resource Set ID.

The second TA command is included in TAC MAC CE. The second TA command indicates an relative amount. The second TA command is received based at least in part on a second C-RNTI (if the second C-RNTI is received in the extended part of suspendConfig IE in RRCRelease message) or based at least in part on a second CS-RNTI (if the second C-RNTI is not received in the extended part of suspendConfig IE in RRCRelease message and if the second CS-RNTI is received in the extended part of suspendConfig IE in RRCRelease message) or based at least in part on a third C-RNTI (if neither second C-RNIT nor second CS-RNTI are received in the extended part of suspendConfig IE in RRCRelease message) in RRC_INACTIVE and based at least in part on a first C-RNTI in RRC_CONNECTED.

Applying, by the base station, value indicated in the timeAlignmentTimer IE in the system information block 1 to the first timer. Applying the first TA command received in the RAR and starting the first timer by the base station. Transmitting, by the base station to the terminal, a MAC PDU based at least in part on a downlink assignment for the first C-RNTI. Applying a second TA command received in a TAC MAC CE and restarting the first timer by the base station if the MAC PDU includes the TAC MAC CE. Releasing a first resource when the first timer expires Transmitting, by the base station to the terminal, a MAC PDU based at least in part on a downlink assignment for the second C-RNTI. Applying a second TA command received in a TAC MAC CE and restarting a plurality of timers by the terminal if the MAC PDU includes the TAC MAC CE and if the downlink assignment is for the second C-RNTI and if the UE is in RRC_INACTIVE. The plurality of timers includes a first timer, if running, and a second timer, if running, and a third timer if running. Applying a second TA command received in a TAC MAC CE and restarting a first timer if the MAC PDU includes the TAC MAC CE and if the downlink assignment is for the first C-RNTI and if the UE is RRC_CONNECTED.

Performing, by the base station for the UE in RRC_CONNECTED, initial uplink reception for the configured grant in the first symbol in the first subframe. Performing, by the base station for the UE in RRC_CONNECTED, initial uplink reception for the configured grant in the first symbol in the first subframe. Performing, by the base station for the UE in RRC_CONNECTED, uplink rereception in the second symbol in the second subframe. Performing, by the base station for the UE in RRC_CONNECTED, initial uplink reception for the configured grant in the first symbol in the first subframe based at least in part on a first p0. Performing, by the base station for the UE in RRC_CONNECTED, uplink rereception in the second symbol in the second subframe based at least in part on a first p0. The first p0 is determined based at least in part on the first ConfiguredGrantConfig and the first PUSCH-Config. The first p0 is determined by p0-PUSCH-Alpha field of the first ConfigurdGrantConfig and the corresponding p0 field in the first PUSCH-Config.

Performing, by the base station, SRS reception based at least in part on the Positioning SRS Resource Set in the fourth UL BWP of the fourth cell if the Positioning SRS is activated and if the fourth UL BWP is active and if the first timer associated with the fourth cell is running. Performing, by the base station, SRS reception based at least in part on the Positioning SRS Resource Set in the third UL BWP of the first cell if the Positioning SRS is activated and if the second timer is running.

The first cell is the cell where the first RRCRelease message is transmitted. The first RRCRelease message includes the second IE group2 or the third IE group Terminal's PUSCH transmission power for the configured grant is determined based at least in part on p0-NominalWithoutGrant and p0 and pathloss and transmission format and transmission bandwidth.

Terminal's PUSCH transmission power for the PUSCH scheduled by RAR in RA-SDT is determined based at least in part on p0-NominalWithGrant and p0 and pathloss and transmission format and transmission bandwidth.

PUSCH transmission is scrambled based at least in part on dataScramblingIdentityPUSCH.

Whether to enable or disable frequency hopping for PUSCH transmission is determined based at least in part on frequencyHopping.

Figure 3:
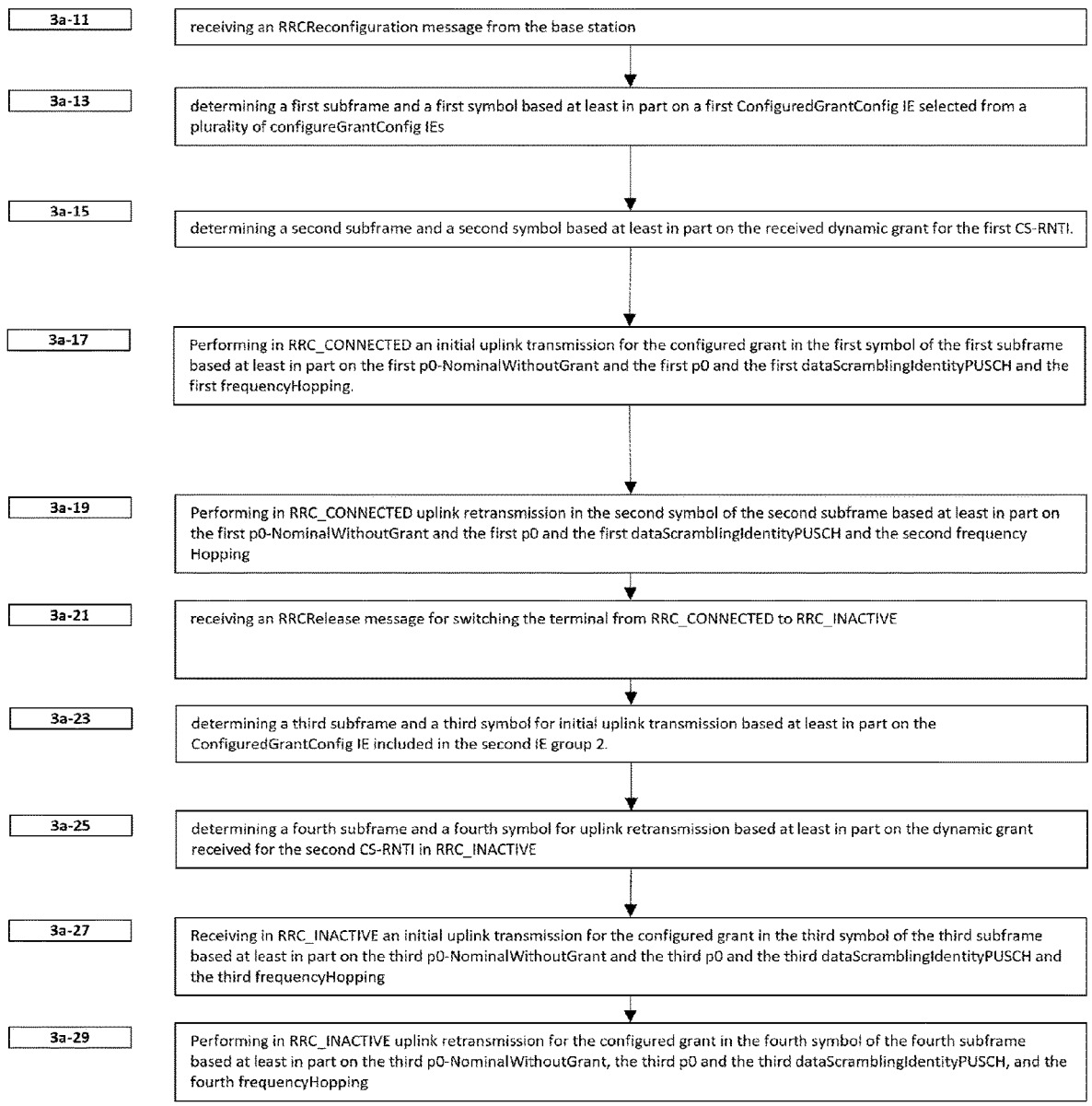
FIG. 3 is a flow diagram illustrating an operation of a terminal.

FIG. 3 is a flow diagram illustrating an operation of a terminal.

In step 3a-11, the terminal receives an RRCReconfiguration message from the base station.

The RRCreconfiguration message includes an RNTIValue IE for the first CS-RNTI, a plurality of configureGrantConfig IEs, a plurality of PUSCH-Config IEs, and a plurality of SRS-Config IEs. Each of the plurality of configureGrantConfig IEs is associated with an uplink BWP of NUL or an uplink BWP of SUL, each of the plurality of PUSCH-Config IEs is associated with an uplink BWP of NUL or an uplink BWP of SUL, and each of the plurality of PUSCH-Config IEs is associated with a plurality of SRS-Config IEs Each is associated with uplink BWP of NUL or uplink BWP of SUL.

In step 3a-13, the terminal determines a first subframe and a first symbol based at least in part on a first ConfiguredGrantConfig IE selected from a plurality of configureGrantConfig IEs.

In step 3a-15, the UE determines a second subframe and a second symbol based at least in part on the received dynamic grant for the first CS-RNTI.

In step 3a-17, the UE in RRC_CONNECTED performs an initial uplink transmission for the configured grant in the first symbol of the first subframe based at least in part on the first p0-NominalWithoutGrant and the first p0 and the first dataScramblingIdentityPUSCH and the first frequencyHopping.

In step 3a-19, the UE in RRC_CONNECTED performs uplink retransmission in the second symbol of the second subframe based at least in part on the first p0-NominalWithoutGrant and the first p0 and the first dataScramblingIdentityPUSCH and the second frequency Hopping.

The first p0-NominalWithoutGrant is included in the first PUSCH-Config, the first p0 is determined based at least in part on the first ConfiguredGrantConfig and the first PUSCH-Config, and the first p0 is a p0-PUSCH-Alpha of the first ConfigurdGrantConfig. field and the corresponding p0 field of the first PUSCH-Config, the first dataScramblingIdentityPUSCH is included in the first PUSCH-Config, the first FrequencyHopping is included in the first ConfiguredGrantConfig, and the second frequencyHopping is included in the first PUSCH-Config. included.

In step 3a-21, the terminal receives an RRCRelease message for switching the terminal from RRC_CONNECTED to RRC_INACTIVE.

The RRCRelease message includes a SuspendConfig IE, and the SuspendConfig IE includes a first IE group, a second IE group 1, a second IE group 2, and a third IE group.

In step 3a-23, the terminal determines a third subframe and a third symbol for initial uplink transmission based at least in part on the ConfiguredGrantConfig IE included in the second IE group 2.

In step 3a-25, the UE determines a fourth subframe and a fourth symbol for uplink retransmission based at least in part on the dynamic grant received for the second CS-RNTI in RRC_INACTIVE.

The second CS-RNTI is included in the suspendConfig extension part of the RRCRelease message.

In step 3a-27, the UE of RRC_INACTIVE receives an initial uplink transmission for the configured grant in the third symbol of the third subframe based at least in part on the third p0-NominalWithoutGrant and the third p0 and the third dataScramblingIdentityPUSCH and the third frequencyHopping.

In step 3a-29, the UE of RRC_INACTIVE perform uplink retransmission for the configured grant in the fourth symbol of the fourth subframe based at least in part on the third p0-NominalWithoutGrant, the third p0 and the third dataScramblingIdentityPUSCH, and the fourth frequency-Hopping.

The third p0-NominalWithoutGrant is included in the second PUSCH-Config. The third p0 is determined at least based on the value indicated in the p0-PUSCH-alpha field and the presence of the sdt-P0-PUSCH field of the second IE group and the value indicated in the sdt-P0-PUSCH field and the corresponding p0 of the second PUSCH-Config. The third dataScramblingIdentityPUSCH is included in the second PUSCH-Config, the third frequencyHopping is included in the second ConfiguredGrantConfig IE of the second IE group 2, and the fourth frequencyHopping is included in the second PUSCH-Config.

Figure 4A:
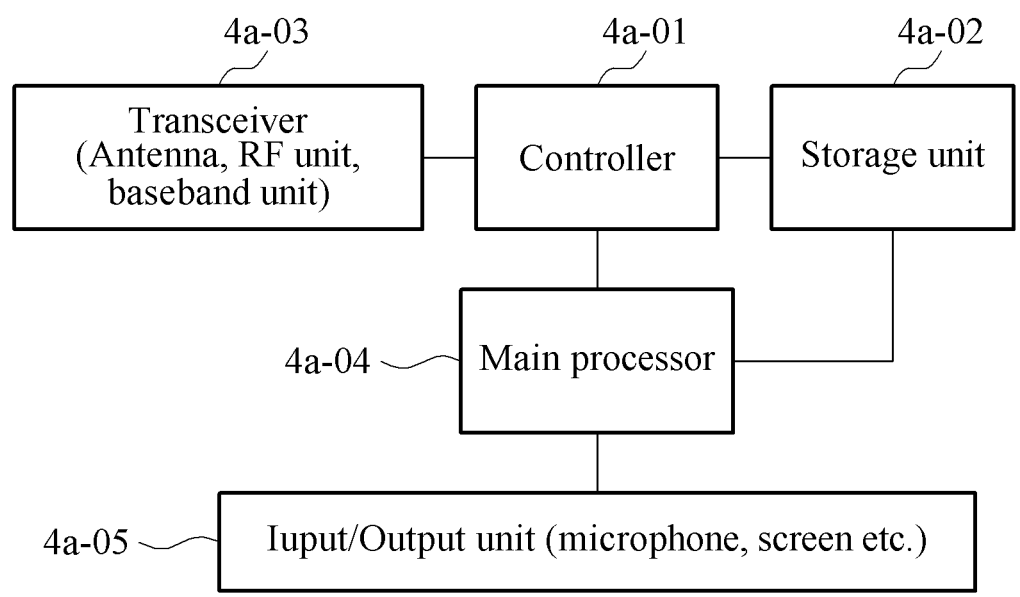
FIG. 4A is a block diagram illustrating the internal structure of a UE to which the disclosure is applied.

FIG. 4A is a block diagram illustrating the internal structure of a UE to which the disclosure is applied.

Referring to the diagram, the UE includes a controller 4a-01, a storage unit 4a-02, a transceiver 4a-03, a main processor 4a-04 and I/O unit 4a-05.

The controller 4a-01 controls the overall operations of the UE in terms of mobile communication. For example, the controller 4a-01 receives/transmits signals through the transceiver 4a-03. In addition, the controller 4a-01 records and reads data in the storage unit 4a-02. To this end, the controller 4a-01 includes at least one processor. For example, the controller 4a-01 may include a communication processor (CP) that performs control for communication and an application processor (AP) that controls the upper layer, such as an application program. The controller controls storage unit and transceiver such that UE operations illustrated in FIG. 2 and FIG. 3 are performed.

The storage unit 4a-02 stores data for operation of the UE, such as a basic program, an application program, and configuration information. The storage unit 4a-02 provides stored data at a request of the controller 4a-01.

The transceiver 4a-03 consists of a RF processor, a baseband processor and plurality of antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor 4a-04 controls the overall operations other than mobile operation. The main processor 4a-04 process user input received from I/O unit 4a-05, stores data in the storage unit 4a-02, controls the controller 4a-01 for required mobile communication operations and forward user data to I/O unit 905.

I/O unit 4a-05 consists of equipment for inputting user data and for outputting user data such as a microphone and a screen. I/O unit 4a-05 performs inputting and outputting user data based on the main processor's instruction.

Figure 4B:
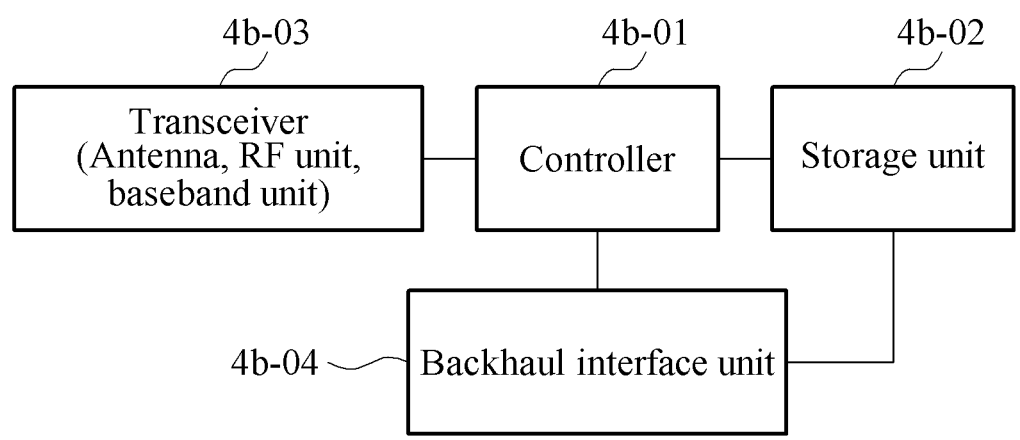
FIG. 4B is a block diagram illustrating the configuration of a base station according to the disclosure.

FIG. 4B is a block diagram illustrating the configuration of a base station according to the disclosure.

As illustrated in the diagram, the base station includes a controller 4b-01, a storage unit 4b-02, a transceiver 4b-03 and a backhaul interface unit 4b-04.

The controller 4b-01 controls the overall operations of the main base station. For example, the controller 4b-01 receives/transmits signals through the transceiver 4b-03, or through the backhaul interface unit 4b-04. In addition, the controller 4b-01 records and reads data in the storage unit 4b-02. To this end, the controller 4b-01 may include at least one processor. The controller controls transceiver, storage unit and backhaul interface such that base station operation illustrated in FIG. 2 are performed.

The storage unit 4b-02 stores data for operation of the main base station, such as a basic program, an application program, and configuration information. Particularly, the storage unit 4b-02 may store information regarding a bearer allocated to an accessed UE, a measurement result reported from the accessed UE, and the like. In addition, the storage unit 4b-02 may store information serving as a criterion to deter mine whether to provide the UE with multi-connection or to discontinue the same. In addition, the storage unit 4b-02 provides stored data at a request of the controller 4b-01.

The transceiver 4b-03 consists of a RF processor, a baseband processor and plurality of antennas. The RF processor performs functions for transmitting/receiving signals through a wireless channel, such as signal band conversion, amplification, and the like. Specifically, the RF processor up—converts a baseband signal provided from the baseband processor into an RF band signal, transmits the same through an antenna, and down-converts an RF band signal received through the antenna into a baseband signal. The RF processor may include a transmission filter, a reception filter, an amplifier, a mi10r, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit 4b-04 provides an interface for communicating with other nodes inside the network. The backhaul interface unit 4b-04 converts a bit string transmitted from the base station to another node, for example, another base station or a core network, into a physical signal, and converts a physical signal received from the other node into a bit string.

What is claimed is:

1. A method by a terminal, the method comprising:
    receiving, by the terminal in RRC_CONNECTED from a base station, a RRCRelease, the RRCRelease includes a SuspendConfig, the SuspendConfig includes a PUSCH-Config and a ConfigurdGrantConfig and a Configured Scheduling-Radio Network Temporary Identifier (CS-RNTI);
    storing, by the terminal, a C-RNTI used in a source PCell;
    performing, by the terminal, state transition to RRC_INACTIVE and cell selection;
    monitoring, by the terminal during a first time period in RRC_INACTIVE, a first RNTI in a first search space; and
    monitoring, by the terminal during a second time period in RRC_INACTIVE, a second RNTI in a second search space,
    wherein a Physical Uplink Shared Channel (PUSCH) initial transmission is performed during the second time period by the terminal in RRC_INACTIVE based on a configured uplink grant, and
    wherein a PUSCH retransmission is performed during the second time period by the terminal in RRC_INACTIVE based on a dynamic uplink grant, and
    wherein transmission power for the PUSCH is determined based on presence of a second power offset in the ConfiguredGrantConfig, and
    wherein the first search space is indicated in PDCCH-ConfigCommon in a system information and the second search space is indicated in PDCCH-Config in the RRCRelease, and
    wherein the first RNTI is a P-RNTI and the second RNTI is the CS-RNTI in the SuspendConfig.

2. The method of claim 1,
    wherein transmission power of PUSCH is determined based on a first power offset and a second power offset if the second power offset is present in the ConfigurdGrantConfig and based on the first power offset and p0-PUSCH-AlphaSet in the PUSCH-Config if the second power offset is absent in the ConfiguredGrantConfig.

3. A terminal in a wireless communication system, the terminal comprising:
    a transceiver configured to transmit and receive a signal, and
    a controller configured to control the transceiver to:
    receive in RRC_CONNECTED from a base station a RRCRelease, the RRCRelease includes a SuspendConfig, the SuspendConfig includes a PUSCH-Config and a ConfigurdGrantConfig and a Configured Scheduling-Radio Network Temporary Identifier (CS-RNTI), store a C-RNTI used in a source PCell, perform state transition to RRC_INACTIVE and cell selection, monitor, during a first time period in RRC_INACTIVE, a first RNTI in a first search space, and monitor, during a second time period in RRC_INACTIVE, a second RNTI in a second search space, wherein a Physical Uplink Shared Channel (PUSCH) initial transmission is performed during the second time period in RRC_INACTIVE based on a configured uplink grant, and wherein a PUSCH retransmission is performed during the second time period in RRC_INACTIVE based on a dynamic uplink grant, and wherein transmission power for the PUSCH is determined based on presence of a second power offset in the ConfiguredGrantConfig, and wherein the first search space is indicated in PDCCH-ConfigCommon in a system information and the second search space is indicated in PDCCH-Config in the RRCRelease, and wherein the first RNTI is a P-RNTI and the second RNTI is the CS-RNTI in the SuspendConfig.

4. A method by a base station, the method comprising:

transmitting, by the base station to a terminal in RRC_CONNECTED, a RRCRelease, the RRCRelease includes a SuspendConfig, the SuspendConfig includes a PUSCH-Config and a ConfigurdGrantConfig and a Configured Scheduling-Radio Network Temporary Identifier (CS-RNTI);

performing, by the base station, state transition of the terminal to RRC_INACTIVE;

performing, by the base station from the terminal in RRC_INACTIVE during the second time period, a Physical Uplink Shared Channel (PUSCH) initial reception based on a configured uplink grant; and performing, by the base station from the terminal in RRC_INACTIVE during the second time period, a PUSCH reception for retransmission based on a dynamic grant, wherein the first search space is indicated in PDCCH-ConfigCommon in a system information and the second search space is indicated in PDCCH-Config in the RRCRelease, and wherein the first RNTI is a P-RNTI and the second RNTI is the CS-RNTI in the SuspendConfig.

* * * * *